United States Patent [19]
Beer et al.

[11] Patent Number: 5,910,458
[45] Date of Patent: Jun. 8, 1999

[54] GLASS FIBER MATS, THERMOSETTING COMPOSITES REINFORCED WITH THE SAME AND METHODS FOR MAKING THE SAME

[75] Inventors: Kenneth D. Beer, Vandergrift, Pa.; Christopher G. Cross, Forest City, N.C.; Thomas V. Thimons, Allison Park; Thomas P. Unites, Library, both of Pa.

[73] Assignee: PPG Industries, Inc., Pittsburgh, Pa.

[21] Appl. No.: 08/866,775

[22] Filed: May 30, 1997

[51] Int. Cl.$^6$ ............................... D04H 1/74; B32B 5/06
[52] U.S. Cl. ........................ 442/367; 442/388; 442/391; 442/402; 442/97; 442/108; 442/174; 442/175; 442/10; 442/331
[58] Field of Search ...................... 442/367, 366, 442/381, 388, 391, 402, 97, 108, 174, 175, 176, 180, 330, 331

[56] References Cited

U.S. PATENT DOCUMENTS

| | | | |
|---|---|---|---|
| 3,614,936 | 10/1971 | Philipps | 122/420 |
| 3,664,909 | 5/1972 | Ackley | 161/141 |
| 3,713,962 | 1/1973 | Ackley | 161/154 |
| 3,850,723 | 11/1974 | Ackley | 156/180 |
| 3,883,333 | 5/1975 | Ackley | 65/2 |
| 3,889,035 | 6/1975 | Jakes | 428/227 |
| 3,997,306 | 12/1976 | Hedden | 65/3 C |
| 4,277,531 | 7/1981 | Picone | 428/228 |
| 4,278,720 | 7/1981 | Shannon | 428/109 |
| 4,305,742 | 12/1981 | Barch et al. | 65/3.43 |
| 4,335,176 | 6/1982 | Baumann | 428/228 |
| 4,404,717 | 9/1983 | Neubauer | 28/107 |
| 4,532,169 | 7/1985 | Carley | 428/109 |

(List continued on next page.)

FOREIGN PATENT DOCUMENTS

| | | |
|---|---|---|
| 0 221 336 | 5/1987 | European Pat. Off. . |
| 0 646 454 | 4/1995 | European Pat. Off. . |
| 0745716 | 12/1996 | European Pat. Off. . |
| 2 547 238 | 12/1984 | France . |
| 4442858 | of 0000 | Germany . |
| 3535272 | 4/1995 | Germany . |
| 76016077 | of 0000 | Japan . |
| 6-248550 | 9/1994 | Japan . |
| 1443754 | 7/1976 | United Kingdom . |
| 2 180 562 | 4/1987 | United Kingdom . |
| WO 92/00491 | 3/1992 | WIPO . |

OTHER PUBLICATIONS

K. Lowenstein, *The Manufacturing Technology of Continuous Glass Fibres*, (3d Ed. 1993) at pp. 22–27, 30–44, 47–60, 115–151, 162–173, 219–222, 293–303, 309–311 and 315.

*Encyclopedia of Polymer Science and Technology*, vol. 6 (1967) at pp. 505–712.

*Hawley's Condensed Chemical Dictionary*, (12th Ed., 1993) at p. 934.

"From Bale to Nonwoven Web in One Continuous Operation," a publication of Rando, Inc., (Sep. 1990) at pp. 4–5.

*Primary Examiner*—Marion McCamish
*Assistant Examiner*—Cheryl Juska
*Attorney, Agent, or Firm*—Andrew C. Siminerio; Ann Marie Cannoni

[57] ABSTRACT

The present invention provides a needled mat adapted to reinforce a thermosetting matrix material to form a composite, composites formed therefrom, and methods related thereto. The needled mat includes a primary layer of a plurality of unidirectional continuous glass fiber strands coated with a composition which is compatible with the thermosetting matrix material and a secondary layer positioned thereon of a plurality of randomly oriented, generally continuous and/or chopped glass fiber strands coated with a composition which is compatible with the thermosetting matrix material. The mat has a total surface weight ranging from about 1300 to about 11,500 grams per square meter.

25 Claims, 6 Drawing Sheets

U.S. PATENT DOCUMENTS

| | | | |
|---|---|---|---|
| 4,615,717 | 10/1986 | Neubauer et al. | 65/4.4 |
| 4,692,375 | 9/1987 | Neubauer et al. | 428/299 |
| 4,749,613 | 6/1988 | Yamada et al. | 428/286 |
| 4,885,205 | 12/1989 | Wahl et al. | 428/285 |
| 4,902,215 | 2/1990 | Seemann, III | 425/406 |
| 4,927,684 | 5/1990 | Asensio et al. | 428/91 |
| 4,931,358 | 6/1990 | Wahl et al. | 428/285 |
| 5,052,906 | 10/1991 | Seemann | 425/112 |
| 5,129,113 | 7/1992 | Kimura et al. | 28/107 |
| 5,316,462 | 5/1994 | Seemann | 425/112 |
| 5,344,687 | 9/1994 | Grimnes | 428/102 |
| 5,437,928 | 8/1995 | Thimons et al. | 428/391 |
| 5,439,635 | 8/1995 | Seemann | 264/510 |
| 5,441,590 | 8/1995 | Ihm et al. | 156/148 |
| 5,540,986 | 7/1996 | Kimura et al. | 428/285 |
| 5,569,344 | 10/1996 | Grimnes | 156/90 |
| 5,580,646 | 12/1996 | Jansz et al. | 428/228 |

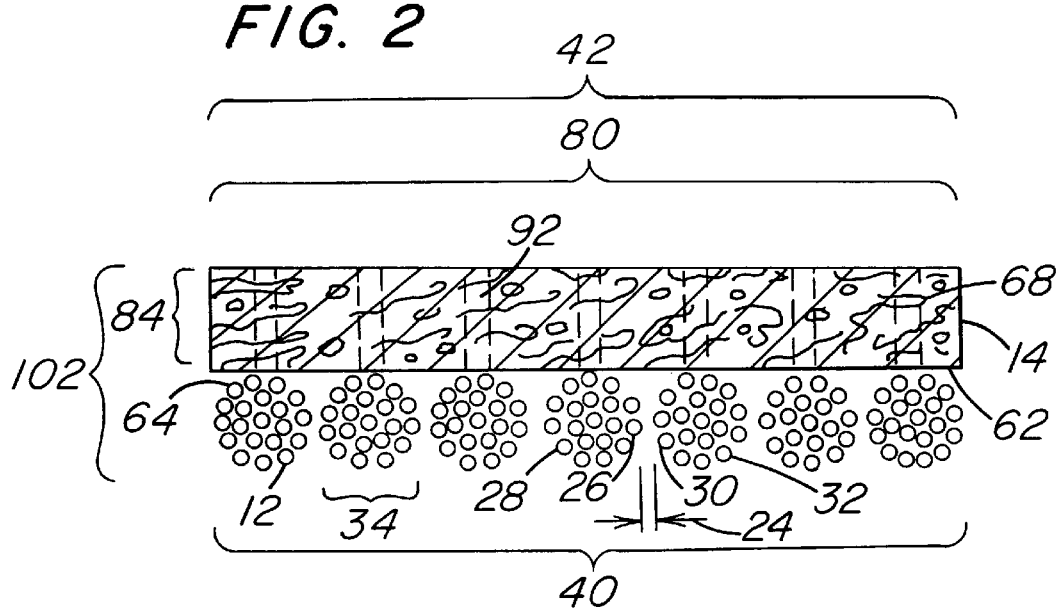
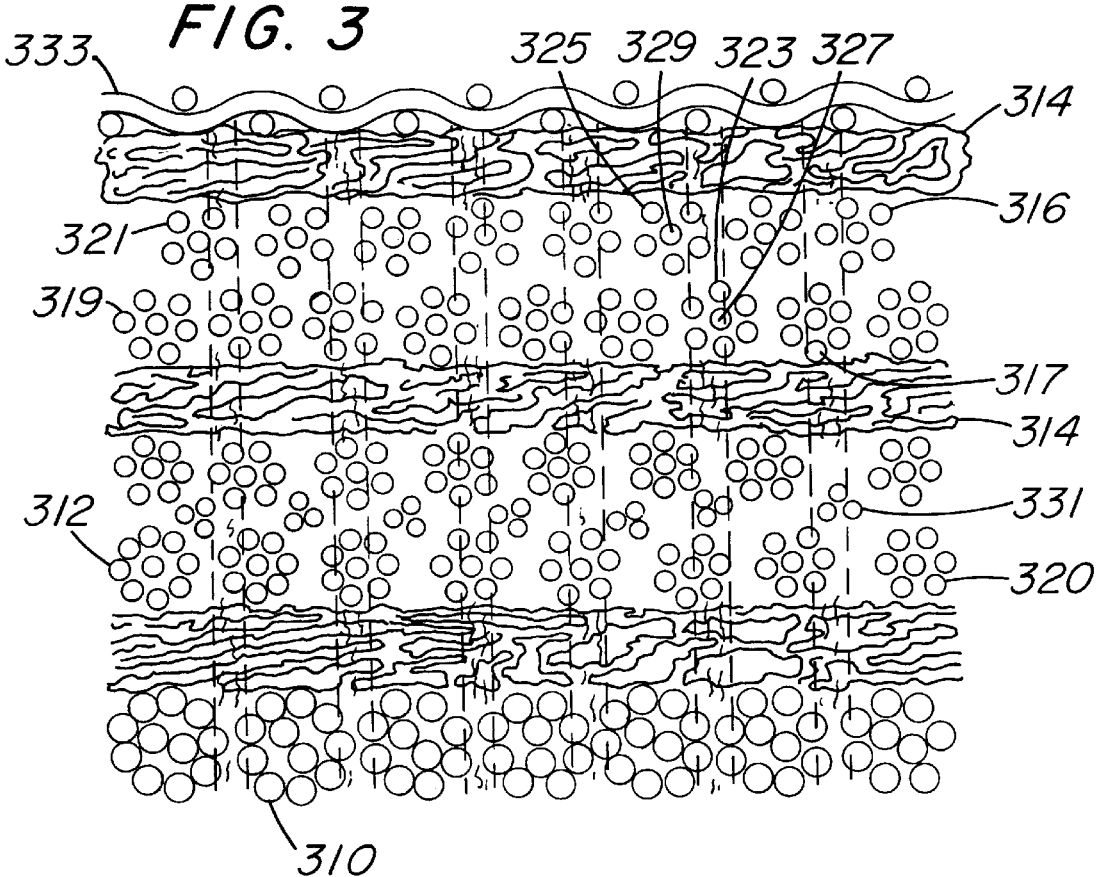

GLASS FIBER MATS, THERMOSETTING COMPOSITES REINFORCED WITH THE SAME AND METHODS FOR MAKING THE SAME

FIELD OF THE INVENTION

This invention relates generally to glass fiber mats, thermosetting composites reinforced with the same and methods for making the same. More particularly, this invention relates to needled mats having a primary layer of unidirectional continuous glass fiber strands and a secondary layer of randomly oriented continuous and/or chopped glass fiber strands, thermosetting composites reinforced with such mats and methods for making the same.

BACKGROUND OF THE INVENTION

Composites of reinforcements and thermosetting matrix materials can be formed by various molding techniques such as pultrusion, filament winding, vacuum molding, compression or injection molding and open lay-up molding. The resulting composites can be used in such applications as automobile components, boat hulls and fishing rods.

The configuration and type of reinforcement have a pronounced effect on the physical characteristics of the composite, such as density, compressive strength and shear strength. Preferred reinforcement configurations often vary greatly for different molding processes and molding conditions.

The matrix material selected can also influence the selection of reinforcement type and configuration. For example, reinforcements typically used for reinforcing thermoplastic matrix materials may not be compatible with thermosetting molding operations. In thermosetting molding operations, good "wet-through" (penetration of the polymeric matrix material through the mat) and "wet-out" (penetration of the polymeric matrix material through the individual bundles or strands of fibers in the mat) properties are desirable. In contrast, good dispersion properties are of predominant concern in typical thermoplastic molding operations.

For reinforcing plastic articles, U.S. Pat. No. 3,614,936 discloses a nonwoven structure of chopped glass strand which is stitched together. Optionally, the nonwoven structure can include parallel glass strands lengthwise of the structure (see col. 6, lines 48–55). The stitched nonwoven structure can be compacted with heated rollers to fuse the stitching thread and then needled (see col. 4, lines 14–30).

U.S. Pat. No. 4,749,613 discloses a thermoplastic stampable sheet composed of 30 to 80 percent by weight of reinforcing fibers arranged in one direction needled together with a swirled continuous strand mat, the sheet being impregnated with a thermoplastic resin.

U.S. Pat. No. 4,931,358 discloses a material consisting of a thermoplastic polymer and a needled textile fabric consisting of at least two layers of continuous filament yarn oriented in at least one preferred direction and at least one layer of unoriented fibers.

U.S. Pat. Nos. 5,540,986 and 5,129,131 disclose a stampable sheet of thermoplastic resin reinforced with a glass fiber mat having a layer of non-oriented fibers and a layer of unidirectional fibers which are mechanically intertwined.

None of the foregoing references address the problems encountered in molding thermosetting composites, such as wet-out and compatibility between the reinforcement and the thermosetting matrix material.

U.S. Pat. No. 4,278,720 discloses a mat useful in thermosetting sheet molding compounding which has two layers of parallel strand oriented at a 45 degree angle to the longitudinal axis of the mat and a layer of randomly oriented strand positioned therebetween, the points of intersection of the strands being bonded by an organic binder, as discussed at column 2, lines 26–35. Use of organic binders in mat formation is not desirable for environmental reasons.

There is a long-felt need in the thermosetting molding industry to provide a glass fiber reinforcement which is compatible with thermosetting matrix materials, which can be used in a wide variety of thermosetting molding applications to provide good uniformity and handling characteristics and which provides a composite having good physical properties such as flexibility, strength and high density.

SUMMARY OF THE INVENTION

One aspect of the present invention is a mat adapted to reinforce a thermosetting matrix material, the mat comprising: (a) a primary layer comprising a plurality of generally parallel, essentially continuous glass fiber strands oriented generally parallel to a longitudinal axis of the mat, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials, the primary layer comprising about 45 to about 90 weight percent of the mat on a total solids basis; and (b) a secondary layer positioned adjacent to a surface of the primary layer, the secondary layer comprising a plurality of randomly oriented, generally continuous glass fiber strands, at least a portion of outer surfaces of the plurality of the glass fiber strands of the secondary layer having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, wherein the strands of the primary layer are entangled with the strands of the secondary layer by needling together at least a portion of the strands of the primary layer and the strands of the secondary layer to form a mat, the primary layer and the secondary layer of the mat having a total surface weight ranging from about 1300 to about 11,500 grams per square meter.

Another aspect of the present invention is a mat adapted to reinforce a thermosetting matrix material, the mat comprising: (a) a primary layer comprising a plurality of generally parallel, essentially continuous glass fiber strands oriented generally parallel to a longitudinal axis of the mat, at least a portion of outer surfaces of the plurality of the glass fibers having thereon a layer comprising a first coating composition which is compatible with a thermosetting matrix material, the first coating composition comprising a thermosetting film-forming material, the primary layer comprising about 45 to about 90 weight percent of the mat on a total solids basis; and (b) a secondary layer positioned adjacent to a surface of the primary layer, the secondary layer comprising a plurality of randomly oriented, generally continuous glass fiber strands, at least a portion of outer surfaces of the plurality of the glass fiber strands of the secondary layer having thereon a layer comprising a second coating composition which is compatible with the thermosetting matrix material, the second coating composition comprising a thermosetting film-forming material, wherein the strands of the primary layer are entangled with the strands of the secondary layer by needling together at least a portion of the strands of the primary layer and the strands of the secondary layer to form a mat, the primary layer and the secondary layer of the mat having a total surface weight ranging from about 1300 to about 11,500 grams per square meter.

Another aspect of the present invention is a mat adapted to reinforce a thermosetting matrix material, the mat comprising: (a) a primary layer comprising a plurality of generally parallel, essentially continuous glass fiber strands oriented generally parallel to a longitudinal axis of the mat, at least a portion of outer surfaces of the plurality of the glass fiber strands having thereon a layer comprising a first coating composition which is compatible with the thermosetting matrix material, the first coating composition comprising a polymeric film-forming material which is selected from the group consisting of thermosetting materials, vinyl acetate materials and thermoplastic polyester materials, the primary layer comprising about 45 to about 90 weight percent of the mat on a total solids basis; and (b) a secondary layer positioned adjacent to a surface of the primary layer, the secondary layer comprising a plurality of randomly oriented glass fibers having a average length ranging from about 10 to about 150 millimeters, at least a portion of an outer surfaces of the plurality of the glass fibers of the secondary layer having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, wherein the strands of the primary layer are entangled with the strands of the secondary layer by needling together at least a portion of the strands of the primary layer and the fibers of the secondary layer to form a mat, the primary layer and the secondary layer of the mat having a total surface weight ranging from about 1300 to about 11,500 grams per square meter.

Another aspect of the present invention is a reinforced polymeric composite comprising: (a) a thermosetting matrix material; and (b) a reinforcing mat comprising: (1) a primary layer comprising a plurality of generally parallel, essentially continuous glass fiber strands oriented generally parallel to a longitudinal axis of the mat, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials, the primary layer comprising about 45 to about 90 weight percent of the mat on a total solids basis; and (2) a secondary layer positioned adjacent to a surface of the primary layer, the secondary layer comprising a plurality of randomly oriented, generally continuous glass fiber strands, at least a portion of outer surfaces of the plurality of the glass fiber strands of the secondary layer having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, wherein the strands of the primary layer are entangled with the strands of the secondary layer by needling together at least a portion of the strands of the primary layer and the strands of the secondary layer to form a mat, the primary layer and the secondary layer of the mat having a total surface weight ranging from about 1300 to about 11,500 grams per square meter.

Another aspect of the present invention is a method for making a mat adapted to reinforce a thermosetting matrix material, the method comprising the steps of: (a) positioning a plurality of generally parallel, essentially continuous glass fiber strands generally parallel to a longitudinal axis of the mat to form a primary layer, at least a portion of an outer surfaces of the plurality of the glass fiber strands having thereon a layer comprising a first coating composition which is compatible with a thermosetting matrix material, the first coating comprising a polymeric film-forming material which is selected from the group consisting of thermosetting materials, vinyl acetate materials and thermoplastic polyester materials; (b) dispersing a plurality of essentially continuous glass fiber strands upon a surface of the primary layer to form a secondary layer, at least a portion of outer surfaces of the plurality of the glass fiber strands having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, such that the glass fiber strands of the secondary layer are randomly oriented; and (c) entangling the generally parallel, essentially continuous glass fiber strands of the primary layer with the essentially continuous, randomly oriented glass fiber strands of the secondary layer by needling at least a portion of the strands of the primary layer and the strands of the secondary layer together to form a mat, such that the primary layer and the secondary layer of the mat have a total surface weight ranging from about 1300 to about 11,500 grams per square meter.

Another aspect of the present invention is a method for reinforcing a thermosetting matrix material to form a reinforced composite, the method comprising the steps of: (a) positioning a plurality of generally parallel, essentially continuous glass fiber strands generally parallel to a longitudinal axis of the mat to form a primary layer, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials; (b) dispersing a plurality of essentially continuous glass fiber strands upon a surface of the primary layer to form a secondary layer, at least a portion of outer surfaces of the plurality of the glass fiber strands having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, such that the glass fiber strands of the secondary layer are randomly oriented; (c) entangling the generally parallel, essentially continuous glass fiber strands of the primary layer with the essentially continuous, randomly oriented glass fiber strands of the secondary layer by needling at least a portion of the strands of the primary layer and the strands of the secondary layer together to form a mat, such that the primary layer and the secondary layer of the mat have a total surface weight ranging from about 1300 to about 11,500 grams per square meter; (d) coating and impregnating at least a portion of the mat with the thermosetting matrix material; and (e) at least partially curing the thermosetting matrix material to form a reinforced composite.

BRIEF DESCRIPTION OF THE DRAWINGS

The foregoing summary, as well as the following detailed description of the preferred embodiments, will be better understood when read in conjunction with the appended drawings. In the drawings:

FIG. 2 is a cross sectional view of the mat of FIG. 1, taken along lines 2—2 of FIG. 1;

FIG. 3 is an enlarged end view of a portion of an alternative embodiment of a mat, according to the present invention;

DETAILED DESCRIPTION OF THE PERFERRED EMBODIMENTS

The mats of the present invention are useful for reinforcing thermosetting matrix materials to form composites for such applications as boat hulls, light poles, utility poles and support pilings. During fabrication of the composite, the mats of the present invention exhibit good structural integrity which facilitates handling of the mat and enables the fabricator to decrease mold cycle times. The mats of the present invention can be used as a single ply to reduce cost and decrease fabrication time, yet conform to a wide variety of intricate mold shapes in challenging molding operations, such as vacuum molding.

Thermoset composites fabricated from the mats of the present invention exhibit good flexibility and high density to provide good load bearing capabilities, as well as high shear strength, compressive strength and interlaminar shear strength.

Figure 1:
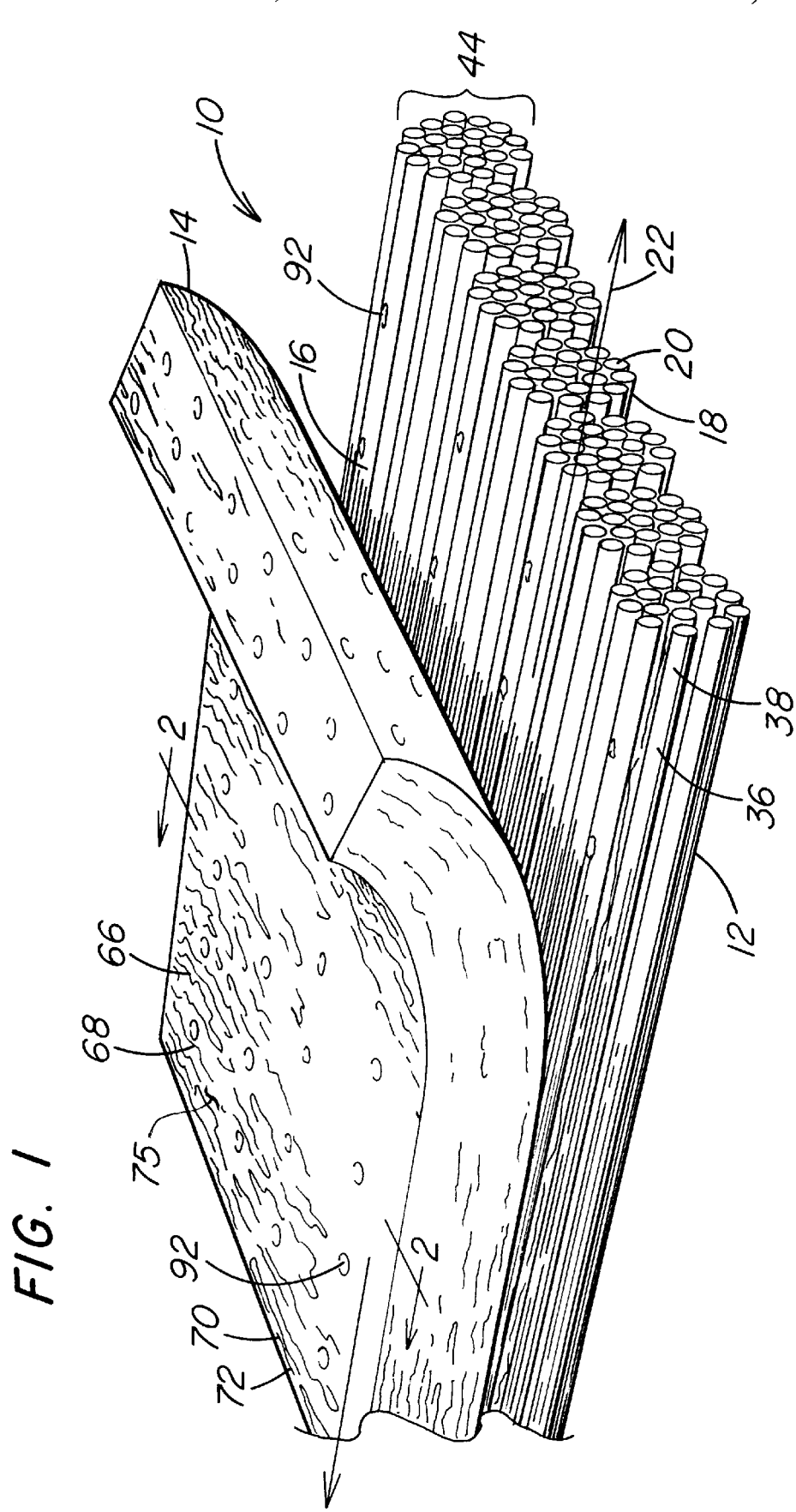
FIG. 1 is an enlarged schematic perspective view of a portion of a mat, according to the present invention.

Referring to the drawings, wherein like numerals indicate like elements throughout, there is shown in FIGS. 1 and 2 a preferred embodiment of a mat, generally designated 10, in accordance with the present invention. The mat 10 comprises one or more primary, support layers 12 and one or more secondary layers 14 positioned adjacent to a surface 16 of the primary layer 12.

Figure 5:
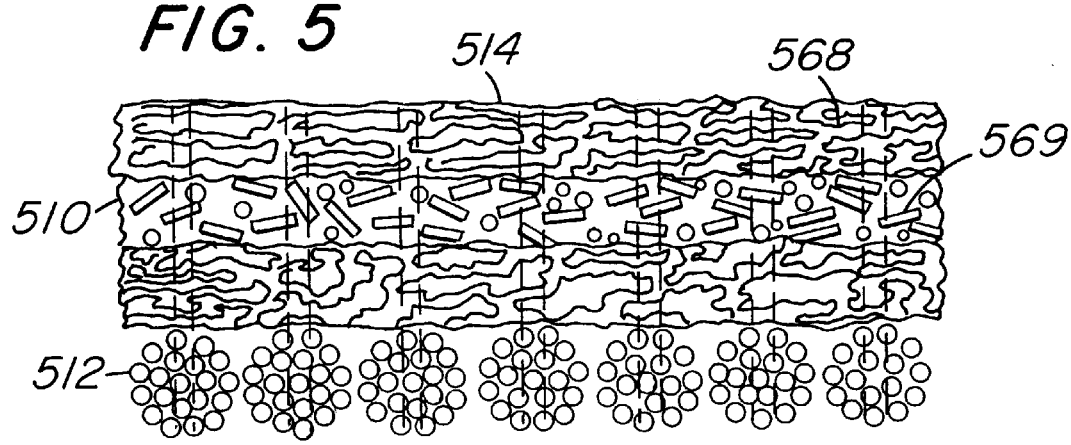
FIG. 5 is an enlarged end view of a portion of another alternative embodiment of a mat, according to the present invention.

As shown in FIG. 1, the preferred mat 10 has a single primary layer 12 and a single secondary layer 14. In an alternative embodiment shown in FIG. 3, the mat 310 can have a plurality of primary layers 312 and/or a plurality of secondary layers 314. For example, one or more secondary layers 314 can be positioned adjacent to the upper surface 316 and/or the lower surface 317 of the primary layer 312, as desired. In another alternative embodiment shown in FIG. 5, the mat 510 has a single primary layer 512 and a plurality of secondary layers 514.

The primary layer 12 generally comprises about 45 to about 90 weight percent of the mat 10, preferably about 50 to about 80 weight percent, and more preferably about 60 to about 80 weight percent of the mat on a total solids basis.

Referring now to FIG. 1, the primary layer 12 comprises a plurality of unidirectional, generally parallel essentially continuous strands 18 of glass fibers 20. As used herein, the term "fibers" means a plurality of individual filaments. The terms "strand" or "bundle" as used herein refer to a plurality of fibers.

As used herein, the phrase "essentially continuous" means that the glass fiber strands 18 can have a average length of about 10 meters to about 400 kilometers (km), and preferably have a average length of about 500 to about 1500 meters.

The phrase "unidirectional" means that the glass fiber strands 18 of the primary layer 12 are oriented generally parallel to a longitudinal axis 22 of the mat (shown in FIG. 1). The phrase "generally parallel to a longitudinal axis 22 of the mat" means that the glass fiber strands 18 are oriented at an angle of less than about 25 degrees with respect to the longitudinal axis 22 of the mat 10. Preferably the glass fiber strands 18 are oriented at an angle of less than about 10 degrees with respect to the longitudinal axis 22 of the mat 10 and, more preferably, the glass fiber strands 18 are parallel to the longitudinal axis 22 of the mat 10, as shown in FIG. 1.

Orienting the glass fiber strands 18 of the primary layer 12 of the mat 10 generally parallel to the longitudinal axis 22 of the mat 10 provides good mechanical strength in the direction of the strand orientation to a composite reinforced with the mat, which is advantageous for support structures such as columns, pilings and poles in which highly directionalized strength and stiffness is desired.

Referring now to FIG. 2, the average distance 24 between the outer surface 26 of a first glass fiber strand 28 and the nearest outer surface 30 of a second, adjacent glass fiber strand 32 can range from about 0.1 to about 20 millimeters (mm), and is preferably about 0.1 to about 10 mm and more preferably about 0.1 to about 5 mm. One skilled in the art would understand that the distance 24 or spacing between pairs of strands can be the same or different for different pairs of strands, as desired. The number of strands (ends) per centimeter of width 40 of the primary layer 12 ranges from about 0.5 to about 500 ends per centimeter, and is preferably about 1 to about 10.

As shown in FIG. 3, the primary layer 312 can comprise multiple sublayers 319, 321 of strands 323, 325 which can be layered such that the respective central longitudinal axes 327, 329 of the strands 323, 325 are vertically aligned or offset, as desired.

The primary layer 12 of the mat 10 comprises glass fibers 20, a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass fibers are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Continuous Glass Fibres*, (3d Ed. 1993) at pages 30–44, 47–60, 115–122 and 126–135, which are hereby incorporated by reference.

The glass fibers 20 can have a nominal filament diameter ranging from about 5.0 to about 35.0 micrometers (corresponding to a filament designation of D through U and above), and preferably have a nominal filament diameter ranging from about 9.0 to about 30.0 micrometers. For further information regarding nominal filament diameters and designations of glass fibers, see *Loewenstein* at page 25, which is hereby incorporated by reference.

Referring to FIGS. 1 and 2, the number of fibers per strand 18, 28, can range from about 100 to about 15,000, and is preferably about 200 to about 7000. For more information regarding glass fiber strand designations, see *Loewenstein* at page 27, which is hereby incorporated by reference.

Referring now to FIG. 1, the glass fibers 20 are coated on at least a portion of their outer surfaces 36 with a layer 38 comprising a first coating composition which is compatible with the thermosetting matrix material (discussed in detail below). As used herein, the phrase "compatible with the thermosetting matrix material" means that the components of the first coating composition facilitate wet-through and wet-out of the matrix material upon the fiber strands 18, provide adequate physical properties in the composite, are chemically compatible with the thermosetting matrix material and are resistant to hydrolysis. The measure of the penetration of the polymeric matrix material through the mat is referred to as "wet-through". The measure of the flowability of the polymeric matrix material through the glass fiber mass to obtain essentially complete encapsulation of the entire surface of each glass fiber by the polymeric matrix material is referred to as "wet-out".

Suitable first coating compositions include sizing compositions and/or secondary coating compositions. As used herein, the terms "size", "sized" or "sizing" refer to the aqueous composition applied to the filaments immediately after formation of the glass fibers. The term "secondary coating" refers to a coating composition applied secondarily to one or a plurality of strands after the sizing composition is applied, and preferably at least partially dried.

The first coating composition comprises one or more polymeric film forming materials which are compatible with the thermosetting matrix material. Suitable polymeric film-forming materials include one or more thermosetting materials, one or more vinyl acetate materials, one or more thermoplastic polyester materials, and mixtures thereof.

Examples of suitable thermosetting film-forming materials include aminoplasts, alkyds, phenolics, polyepoxides, thermosetting polyesters, thermosetting polyurethanes, vinyl polymers, derivatives, copolymers and mixtures thereof.

Useful aminoplasts include urea-formaldehydes and melamine formaldehydes such as RESIMENE 841 which is commercially available from Monsanto Co. of St. Louis, Mo. A non-limiting example of a phenolic suitable for use in the present invention is phenol formaldehyde.

Useful polyepoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. An example of a suitable commercially available epoxy film-forming polymer is EPON® 880 epoxy resin, which is an epoxy functional polyglycidyl ether of bisphenol A prepared from bisphenol-A and epichlorohydrin and is commercially available from Shell Chemical Company of Houston, Tex.

Suitable thermosetting polyurethanes include BAYBOND XW-110, which is commercially available from Bayer Corp. of Pittsburgh, Pa. and other thermosetting polyurethanes which are commercially available from Bayer and E.I. duPont de Nemours Co. of Wilmington, Del.

A preferred thermosetting polyester material is RD-847A polyester resin which is commercially available from Borden Chemicals of Columbus, Ohio. Other suitable thermosetting polyesters are STYPOL polyesters which are commercially available from Cook Composites and Polymers of Port Washington, Wis. and thermosetting NEOXIL polyesters which are commercially available from DSM B.V. of Como, Italy.

As discussed above, thermoplastic vinyl acetate materials and thermoplastic polyester materials which are compatible with the thermosetting matrix material can also be used as polymeric film-forming materials in the present invention. Non-limiting examples of useful thermoplastic vinyl acetate polymers include RESYN 1971, RESYN 2828 and RESYN 1037 vinyl acetate copolymer emulsions which are commercially available from National Starch, VINOL polyvinyl acetates which are commercially available from Air Products and Chemicals Co. of Allentown, Pa. and other polyvinyl acetates which are commercially available from H. B. Fuller.

Thermoplastic polyesters useful in the present invention include saturated bisphenol A polyesters such as Neoxil 954D which is commercially available from DSM, B.V. of the Netherlands.

Preferably the first coating composition comprises a polyepoxide such as EPON® 880 and a thermosetting polyester material such as RD-847A polyester resin in a ratio of about 1:1 to about 6:1 on a total weight basis.

The amount of polymeric film-forming material can be about 10 to about 90 weight percent of the first coating composition on a total solids basis, and is preferably about 60 to about 80 weight percent.

The first coating composition can additionally include one or more thermoplastic vinyl polymers, such as polyvinyl pyrrolidones, in an amount which does not detrimentally affect the compatibility of the polymeric film forming materials discussed above with the thermosetting matrix material. Examples of suitable polyvinyl pyrrolidones include PVP K-15, PVP K-30, PVP K-60 and PVP K-90, each of which are commercially available from ISP Chemicals of Wayne, N.J. The thermoplastic vinyl polymer is preferably present in an amount of about 0.5 to about 10 weight percent of the first coating composition on a total solids basis.

The first coating composition preferably further comprises one or more glass fiber lubricants which are different from the polymeric film-forming materials discussed above. As used herein, the phrase "glass fiber lubricants which are different from the polymeric film-forming materials" means that while the glass fiber lubricants may have film-forming properties, the glass fiber lubricant(s) selected for a particular first coating composition are chemically different from the polymeric film-forming materials included in the same coating composition.

Useful glass fiber lubricants include cationic, non-ionic or anionic lubricants and mixtures thereof. Generally, the amount of fiber lubricant can be about 1 to about 25 weight percent of the first coating composition on a total solids basis.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

The first coating composition preferably comprises one or more coupling agents selected from the group consisting of organo silane coupling agents, transition metal coupling agents (such as titanium, zirconium and chromium coupling agents), amino-containing Werner coupling agents and mixtures thereof. These coupling agents typically have dual functionality. Each metal or silicon atom has attached to it one or more groups which can react or compatibilize with the glass fiber surface and/or the components of the sizing composition. As used herein, the term "compatibilize" with respect to coupling agents means that the groups are chemically attracted, but not bonded, to the glass fiber surface and/or the components of the sizing composition, for example by polar, wetting or solvation forces. Examples of hydrolyzable groups include:

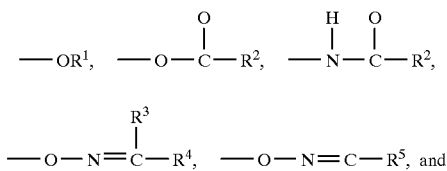

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include Z-6040 gamma-glycidoxypropyltrimethoxysilane (commercially available from Dow Corning), A-187 gamma-glycidoxypropyltrimethoxysilane, A-174 gamma-methacryloxypropyltrimethoxysilane and A-1100 gamma-aminopropyltriethoxysilane silane coupling agents (each of which are commercially available from OSi Specialties, Inc. of Tarrytown, N.Y.).

The amount of coupling agent can be 1 to about 10 weight percent of the first coating composition on a total solids basis. The organo silane coupling agent can be at least partially hydrolyzed with water prior to application to the glass fibers.

Crosslinking materials can also be included in the first coating composition. Non-limiting examples of suitable crosslinkers include melamine formaldehyde and polyamides such as the VERSAMID products which are commercially available from General Mills Chemicals, Inc. The amount of crosslinker can be about 1 to about 5 weight percent of the first coating composition on a total solids basis.

The first coating composition can include one or more emulsifying agents for emulsifying components of the first coating composition. Non-limiting examples of suitable emulsifying agents or surfactants include polyoxyalkylene block copolymers (such as PLURONIC™ F-108 polyoxypropylene-polyoxyethylene copolymer which is commercially available from BASF Corporation of Parsippany, N.J. ), ethoxylated alkyl phenols (such as IGEPAL CA-630 ethoxylated octylphenoxyethanol which is commercially available from GAF Corporation of Wayne, N.J.), polyoxyethylene octylphenyl glycol ethers, ethylene oxide derivatives of sorbitol esters and polyoxyethylated vegetable oils (such as EMULPHOR EL-719, which is commercially available from GAF Corp.). Generally, the amount of emulsifying agent can be about 1 to about 30 weight percent of the first coating composition on a total solids basis.

The first coating composition can also include one or more aqueous dispersible or soluble plasticizers to improve flexibility. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. The amount of plasticizer is preferably less than about 5 weight percent of the first coating composition on a total solids basis.

Fungicides, bactericides and anti-foaming materials and organic and/or inorganic acids or bases in an amount sufficient to provide the aqueous first coating composition with a pH of about 2 to about 10 can also be included in the sizing composition. Water (preferably deionized) is included in the first coating composition in an amount sufficient to facilitate application of a generally uniform coating upon the strand. The weight percentage of solids of the first coating composition generally can be about 5 to about 20 weight percent.

Preferred first coating compositions are sizing compositions such as are disclosed in assignee's U.S. Pat. Nos. 3,997,306 and 4,305,742, which are hereby incorporated by reference.

Another preferred first coating composition includes EPON® 880 epoxy resin and RD-847-A polyester resin as the polymeric film forming materials, PVP K-30 polyvinyl pyrrolidone, EMERY® 6717 partially amidated polyethylene imine lubricant, EMULPHOR EL-719 polyoxyethylated vegetable oil, IGEPAL CA-630 ethoxylated octylphenoxyethanol, PLURONIC™ F-108 polyoxypropylene-polyoxyethylene copolymer, SAG 10 anti-foaming material and A-174 and Z-6040 functional organo silane coupling agents.

The first coating composition can be applied in many ways, for example by contacting the filaments with a static or dynamic applicator, such as a roller or belt applicator, spraying or other means. For a discussion of suitable applicators, see *Loewenstein* at pages 165–172, which is hereby incorporated by reference.

The coated fibers are preferably dried at room temperature or at elevated temperatures to remove excess moisture from the fibers and cure any curable sizing or secondary coating composition components. Drying of glass fiber forming packages or cakes is discussed in detail in *Loewenstein* at pages 219–222, which is hereby incorporated by reference. For example, the forming package can be dried in an oven at a temperature of about 104° C. (220° F.) to about 160° C. (320° F.) for about 10 to about 24 hours to produce glass fiber strands having a dried residue of the composition thereon. The temperature and time for drying the glass fibers will depend upon such variables as the percentage of solids in the first coating composition, components of the first coating composition and type of glass fiber. The first coating composition is preferably present on the fibers as a sizing in an amount ranging from about 0.5 percent to about 2.5 percent by weight after drying.

Alternatively, the first coating composition can be an impregnating or secondary coating having components such as are discussed above which are applied to at least a portion of the surface of the strands in an amount effective to coat or impregnate the portion of the strands. The secondary coating can be conventionally applied by dipping the strand in a bath containing the composition, by spraying the composition upon the strand or by contacting the strand with a static or dynamic applicator such as a roller or belt applicator, for example. The coated strand can be passed through a die to remove excess coating from the strand and/or dried as discussed above for a time sufficient to at least partially dry and cure the secondary coating.

In an alternative embodiment shown in FIG. 3, in addition to the glass fibers 320 the primary layer 312 can further comprise unidirectional, essentially continuous fibers or strands of materials other than glass fibers ("non-glass fibers"). Suitable non-glass fibers 331 believed to be useful in the present invention are discussed at length in the *Encyclopedia of Polymer Science and Technology*, Vol. 6 (1967) at pages 505–712, which are hereby incorporated by reference. As used herein, the term "fiberizable" means a material capable of being formed into a generally continuous filament, fiber, strand or yarn.

Suitable man-made fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507–508, which is hereby incorporated by reference.

Preferably the non-glass fibers do not appreciably soften or decompose at temperatures typically encountered in thermoset molding operations and retain their tensile integrity and do not dissolve into or react with the thermosetting matrix material. It is also preferred that such non-glass fibers 331 not appreciably soften, swell or dissolve in reactive diluents such as styrene, divinyl benzene or methyl methacrylate which are often included in thermosetting polyester and vinyl ester matrix materials.

Suitable man-made fibers include synthetic polymers such as polyamides, polyesters, acrylics, polyolefins, polyurethanes, vinyl polymers, derivatives and mixtures thereof. See *Encyclopedia of Polymer Science and Technology*, Vol. 6 at 506, which is hereby incorporated by reference.

Non-limiting examples of useful polyamide fibers include nylon fibers such as nylon 6 (a polymer of caprolactam which has a melting point of about 223° C.) and nylon 6,6 (a condensation product of adipic acid and hexamethylenediamine which has a melting point of about 264° C.). Suitable nylons are commercially available from E.I. duPont de Nemours and Company of Wilmington, Del. and BASF Corp. of Parsippany, N.J. Other useful polyamides include aramids such as KEVLAR™, which is commercially available from duPont.

Thermoplastic polyester fibers useful in the present invention include those composed of at least 85% by weight of an ester of a dihydric alcohol and terephthalic acid, such as polyethylene terephthalate which has a melting point of about 265° C. according to *Hawley's Condensed Chemical Dictionary* (12th Ed. 1993) at page 934. Examples include DACRON™ which is commercially available from duPont and FORTREL™ which is commercially available from Hoechst Celanese Corp. of Summit, N.J.

Other fibers which are useful in the present invention include those formed from acrylic polymers such as polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology*, Vol. 6 at 559–561.

Useful polyolefin fibers are generally composed of at least 85% by weight of ethylene, propylene, or other olefins. See *Encyclopedia of Polymer Science and Technology*, Vol. 6 at 561–564.

Fibers formed from vinyl polymers which are useful in the present invention can be formed from polyvinyl chloride, polyvinylidene chloride, polytetrafluoroethylene, and polyvinyl alcohol.

Further examples of thermoplastic fiberizable materials which are useful in the present invention are fiberizable polyimides, polyether sulfones, polyphenyl sulfones; polyetherketones, polyphenylene oxides, polyphenylene sulfides and polyacetals.

Other suitable non-glass fibers for reinforcing thermosetting matrix materials include natural fibers, such as cotton or jute, and inorganic fibers such as polycrystalline fibers, ceramics including silicon carbide, and carbon or graphite. It is understood that combinations of such fibers or blends or copolymers formed from any of the above materials can be used as non-glass fibers in the present invention, if desired.

Preferably, the glass fiber strands 18 comprise about 1 to about 100 weight percent of the primary layer 12 of the mat 10 on a total solids basis, and more preferably about 50 to about 100 weight percent. If present, the non-glass fibers 331 of the primary layer 312 can comprise about 1 to about 30 weight percent of the primary layer 312 on a total solids basis, and preferably about 1 to about 10 weight percent.

Referring now to FIG. 2, the width 40 of the primary layer 12 (which corresponds generally to the overall width 42 of the mat 10) can range from about 0.6 to about 3 meters (about 24 to about 120 inches), and preferably ranges from about 1.2 to about 2.8 meters (about 48 to about 110 inches).

The length of the primary layer 12 can vary based upon such factors as the desired length of the product to be transported to the customer. The mat 10 is preferably formed by a generally continuous process as discussed below.

Preferably, the length of the primary layer 12 ranges from about 60 to about 300 meters (about 200 to about 1000 feet), and more preferably about 180 to about 275 meters (about 600 to about 900 feet).

Referring now to FIG. 1, the thickness 44 of the primary layer 12 can range from about 2.5 to about 25 millimeters (about 0.1 to about 1 inch), and preferably ranges from about 10 to about 25 millimeters.

The surface weight of the primary layer 12 of the mat 10 can range from about 585 to about 10,350 grams per square meter (about 1.9 to about 33.8 ounces per square foot) prior to depositing the secondary layer thereon and needling the primary and secondary layers together.

Preferably, the primary layer 12 is not treated or coated with any adhesive or polymeric binder material to promote consolidation of the mat 10, although such binders can be used in accordance with the present invention. Non-limiting examples of useful polymeric binders include polyesters. Suitable polymeric binders can be in the form of a powder, fiber or emulsion, as desired. The binders are consolidated with the mat by the application of heat and pressure, such as by passing the mat between heated calendering rolls.

An antistatic agent, for example an amine, amide or quaternary salt such as soyadimethyl ethylammonium ethosulfate, can be applied to the strands 18 prior to deposition upon the conveyor, if desired.

Figure 8:
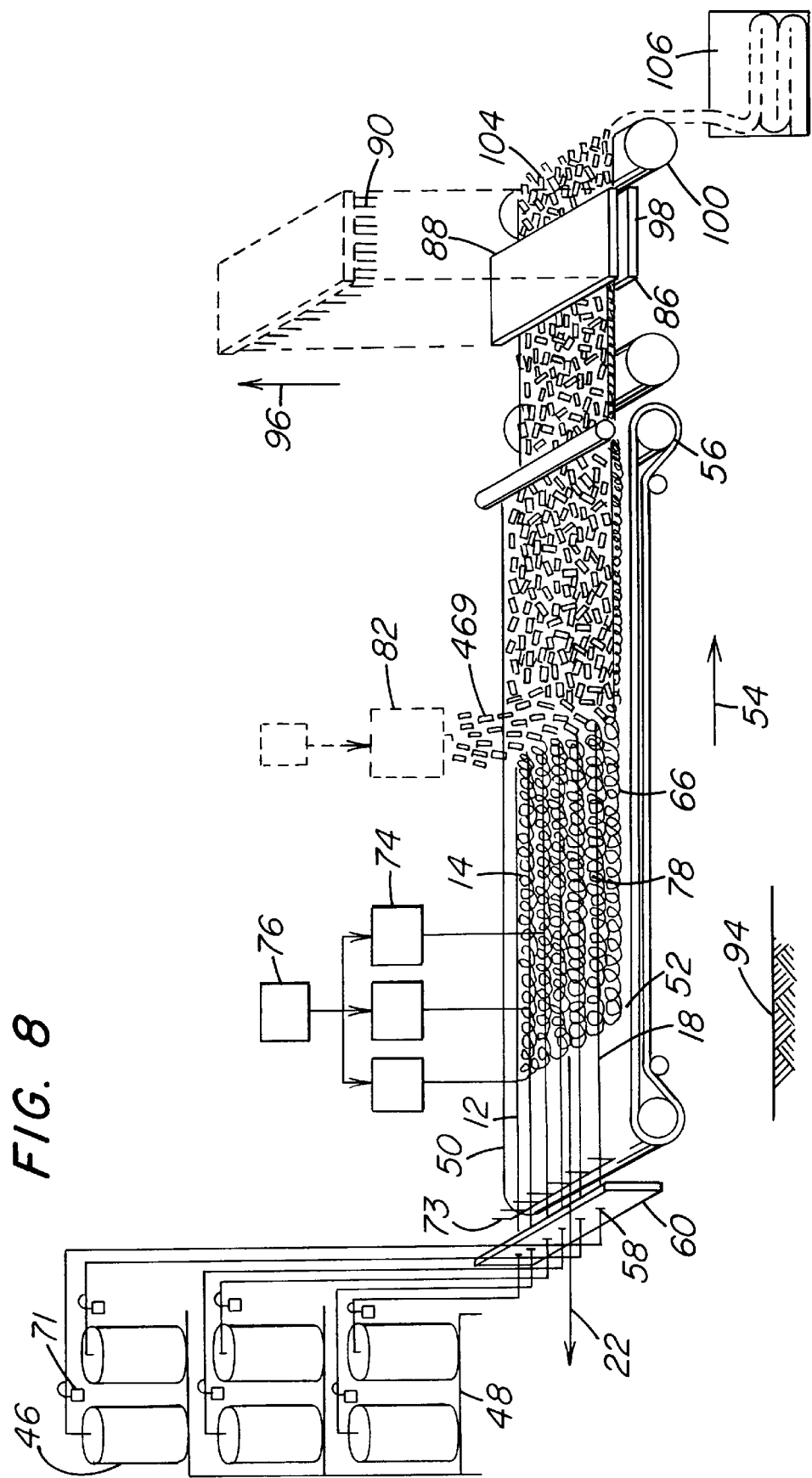
FIG. 8 is a schematic perspective view of a system for forming a mat according to the present invention.

The process for forming the primary layer 12 will now be discussed. Referring now to FIG. 8, the primary layer 12 can be formed, for example, by positioning a plurality of forming or supply packages 46 mounted upon a creel 48 adjacent to a conveyor 50, the surface 52 of which is driven in a direction 54 by a pair of spaced drive rollers 56 which are rotated by a motor (not shown). The surface 52 of the conveyor 50 can be generally smooth or foraminous, such as a chain mesh. Useful conveyors 50 are well known to those skilled in the art and are discussed further below.

Conventional creels suitable for use in the present invention are shown in *Loewenstein* at page 315, which is hereby incorporated by reference. The supply packages can be wound such that the strand 18 can be withdrawn from the inside of the supply package or from the outside of the supply package (known in the art as "filling wind"). The dimensions of the supply package can vary, depending upon such variables as the diameter and type of fiber wound thereon, and are generally determined by convenience for later handling and processing. Generally, supply packages are about 15.2 to about 76.2 centimeters (about 6 to about 30 inches) in diameter and have a length of about 12.7 to about 101.6 centimeters (about 5 to about 40 inches).

The strands 18 can be aligned generally parallel to the longitudinal axis 22 of the mat 10 by tensioning each strand with a tensioning device 71, such as a weight of about 1 ounce or less, and feeding each strand 18 through a corresponding eyelet 58 mounted in a spacer board 60. The position of the eyelet 58 corresponds to the desired position of that strand 18 within the primary layer 12 of the mat 10 The aligned strands 18 are passed through a comb 73, which can be fabricated from a low abrasion material such as ceramic or stainless steel, and then deposited onto the surface 52 of the conveyor 50. The eyelets 58 can be arranged such that a primary layer 12 having a single layer or a plurality of sublayers 319 is formed, as shown in FIGS. 1 and 3, respectively. The number of eyelets 58 corresponds to the number of strands 18 to be aligned.

The diameter of each eyelet 58 is generally slightly larger than the diameter 34 of the corresponding strand 18 passing therethrough. The eyelet 58 is preferably formed from a material which inhibits abrasion of the strand 18, such as ceramic or graphite.

Referring now to FIGS. 1 and 2, the mat 10 comprises one or more secondary layers 14 deposited upon an upper surface 16 of the primary layer 12 such that a first side 62 of the secondary layer 14 is adjacent to a second side 64 of the primary layer 12. The secondary layer 14 comprises a plurality of randomly oriented glass fiber strands 66 which comprise generally continuous glass fiber strands 68 and/or discontinuous or chopped glass fiber strands 469.

The secondary layer 14 can comprise one or more layers of continuous glass fiber strands 68, one or more layers of chopped glass fiber strands 70 and/or one or more layers of a mixture of continuous glass fiber strands 68 and chopped glass fiber strands 70. The number of layers is determined by the intended end use application and desired density of the mat, although a single layer is preferred.

Figure 7:
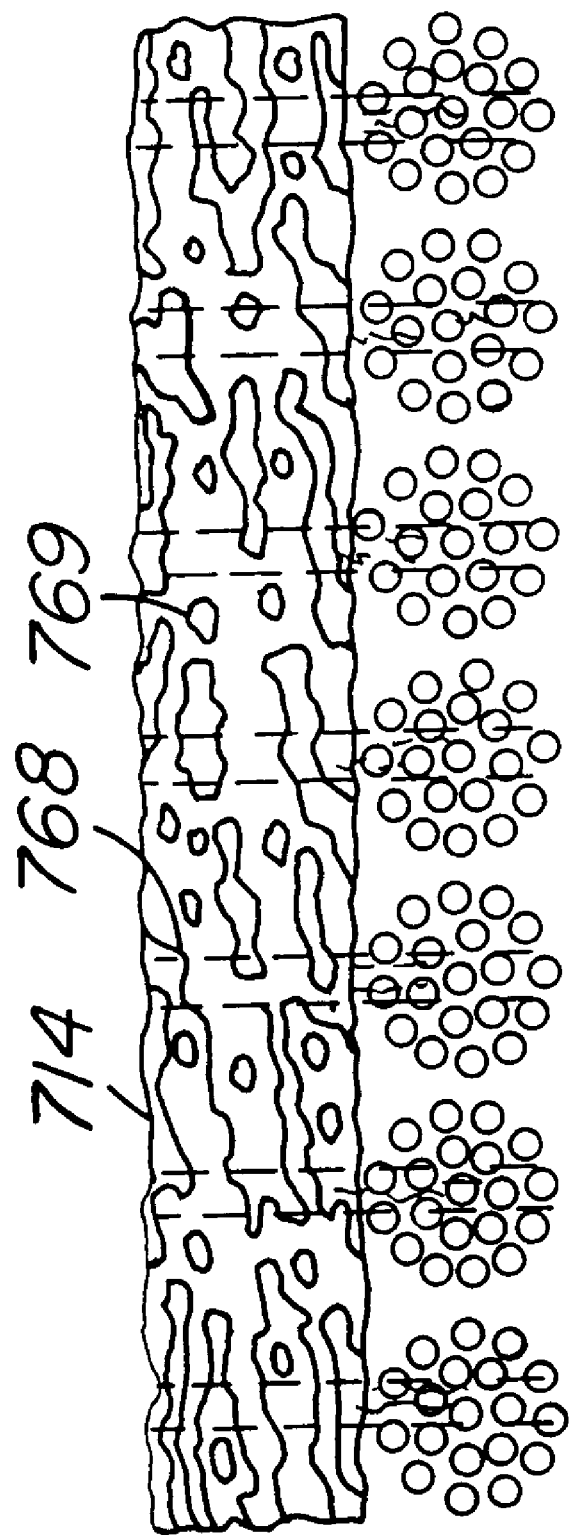
FIG. 7 is an enlarged end view of a portion of another alternative embodiment of a mat, according to the present invention.

The secondary layer 14 can be configured in a variety of different ways. As shown in FIGS. 1 and 2, a secondary layer 14 of generally continuous glass fiber strands 68 is preferred. In an alternative embodiment shown in FIG. 4, the secondary layer 414 of randomly oriented glass fiber strands 466 can be chopped glass fiber strands 469. In another alternative embodiment shown in FIG. 7, the secondary layer 714 can be a mixture of generally continuous glass fiber strands 768 and chopped glass fiber strands 769. In yet another alternative embodiment shown in FIG. 5, the secondary layer 514 comprises alternating layers of randomly oriented continuous glass fiber strands 568 and chopped glass fiber strands 569.

Figure 4:
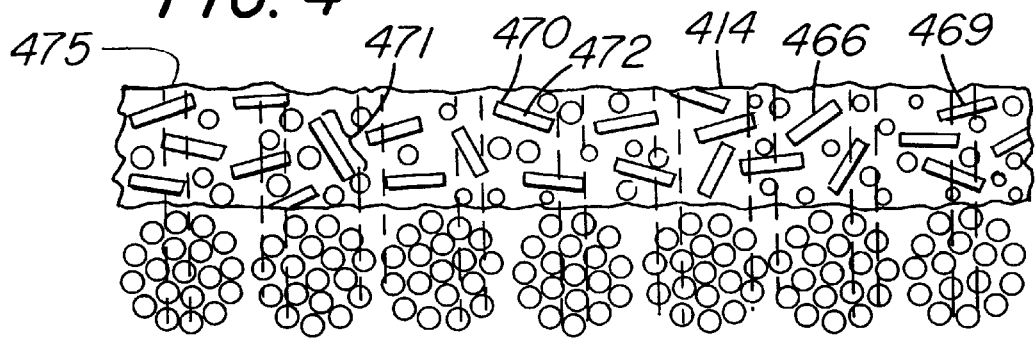
FIG. 4 is an enlarged end view of a portion of another alternative embodiment of a mat, according to the present invention.

Referring now to FIGS. 1 and 4, the randomly oriented glass fiber strands 66, 466, whether continuous or chopped, have on at least a portion of the outer surfaces 75, 475 thereof a layer 72, 472 comprising a second coating composition which is compatible with the thermosetting matrix material (discussed in detail above). Suitable components for the second coating composition are the same as those discussed above for the first coating composition, i.e., polymeric film forming materials which are compatible with the thermosetting matrix material, thermoplastic vinyl polymers, glass fiber lubricants, emulsifiers, coupling agents, crosslinking materials, plasticizers, fungicides, bactericides, anti-foamers and acids for adjusting the pH of the composition. The second coating composition can be applied to the randomly oriented glass fiber strands 66, 466 in a similar manner and in similar amounts to those discussed above for applying the first coating composition to the strands 18 of the primary layer 12.

The second coating composition can have the same components as those of the first coating composition in the same or different amounts. Preferably, the second coating composition has at least one different component from the first coating composition. A preferred secondary coating composition includes EPON® 828 epoxy resin and RD-847-A polyester resin as the polymeric film forming materials, PVP K-30 polyvinyl pyrrolidone, EMERY® 6717 partially amidated polyethylene imine lubricant, EMULPHOR EL-719 polyoxyethylated vegetable oil, IGEPAL CA-630 ethoxylated octylphenoxyethanol, PLURONIC™ F-108 polyoxypropylene-polyoxyethylene copolymer and A-174 functional organo silane coupling agent.

The dimensions of the continuous glass fiber strands 66 and chopped glass fiber strands 469 can be the same as those discussed in detail above for the strands 18 of the primary layer 12. However, the chopped fiber strands 469 preferably have a average length 471 ranging from about 10 to about 150 millimeters (about 0.5 to about 6 inches), and more preferably about 25 to about 100 millimeters.

Preferably, the randomly oriented, generally continuous glass fiber strands 68 comprises 100 weight percent of the secondary layer 14 on a total solids basis, as shown in FIGS. 1 and 2. In the alternative embodiment shown in FIG. 7, the randomly oriented, generally continuous glass fiber strands 768 can comprise about 20 to about 100 weight percent and preferably comprises about 50 to about 100 weight percent of the secondary layer 714 on a total solids basis, with the balance being chopped glass fiber strands 769. In the alternative embodiment shown in FIG. 4, the secondary layer 414 comprises 100 percent chopped glass fiber strands 469 on a total solids basis.

In the alternative embodiment of FIG. 3, the secondary layer 314 can comprise generally continuous and/or chopped non-glass fibers 331 such as those discussed above, preferably in an amount of about 1 to about 10 weight percent of the secondary layer 314 on a total solids basis.

Referring now to FIGS. 1 and 8, in the preferred embodiment in which the glass fiber strands 66 of the secondary layer 14 are generally continuous glass fiber strands 68, the secondary layer 14 can be formed, for example, by positioning a plurality of strand feeders 74 above the conveyor 50 for depositing the secondary layer 14 upon the surface 16 of the primary layer 12.

Each strand feeder 74 is supported for reciprocating movement above the conveyor 50. The movement of each strand feeder 74 is generally transverse to the direction 54 of motion of the conveyor 50. Each strand feeder 74 receives strands 68 from a strand supply 76 and feeds the strands 68 by way of an endless belt between spaced driven pulling wheels. The pulled strands 68 are fed against a deflector plate structured to deposit the strands 68 onto the conveyor 50 as a plurality of loops 78. The strand feeders 74 are continuously traversed across the width of the conveyor such that the loops 78 are deposited across the predetermined width 80 of the secondary layer 14 to be formed.

The generally continuous glass fiber strands 68 are randomly oriented in at least two dimensions, for example by depositing the glass fiber strands 68 onto the conveyor 50 in an array of interleaved layers of generally circular, elongated elliptical and/or random loops 78, each of the loops 78 having a longitudinal axis positioned generally parallel to the longitudinal axis 22 of the mat 10. Preferably the loops are generally elliptical. The diameter of the loops 78 can range from about 75 to about 610 millimeters (about 3 to about 24 inches).

The strand feeders 74 are controlled to form the secondary layer 14 having strands 68 oriented in a predetermined pattern and having a generally constant width and thickness which can be controlled by varying the speed at which the conveyor surface 52 or strand feeders 74 move. The speed at which the conveyor surface 52 is moved can range from about 1.5 to about 9 meters per minute (about 5 to about 30 feet per minute). The speed at which the strand feeders 74 are moved can range from about 25 to about 150 centimeters per second (about 10 to about 60 inches per second).

The number of strand feeders 74 can range from 1 to about 20, and preferably ranges from about 6 to about 20. Three strand feeders 74 are shown in FIG. 8. A non-limiting example of a strand feeder useful in the present invention is disclosed in assignee's U.S. Pat. No. 4,615,717, which is hereby incorporated by reference. Preferably the strand feeder 74 includes a stationary deflector plate. Useful apparatus and processes for forming a mat of continuous strands is disclosed in assignee's U.S. Pat. Nos. 3,883,333, 4,404, 717, 4,615,717, 4,692,375 and 4,995,999 and *Loewenstein* at pages 309–311, which are hereby incorporated by reference.

The strands can be supplied to the feeders 74 from a strand supply 76 which can be a plurality of forming or supply packages mounted upon a creel, such as are discussed above for use in forming the primary layer 12.

In an alternative embodiment, the strand supply 76 is a fiber forming apparatus which comprises a glass melting furnace or forehearth containing a supply of a fiber forming mass or molten glass and having a precious metal bushing or spinneret attached to the bottom of the forehearth. The bushing is provided with a series of orifices in the form of tips through which molten glass is drawn in the form of individual fibers or filaments at a high rate of speed. Such fiber forming apparatus are well known to those skilled in the art and further discussion thereof is not believed to be necessary in view of the present disclosure. Suitable fiber forming apparatus are discussed in *Loewenstein* at pages 22–27 and 119–151, which are hereby incorporated by reference.

The glass fibers can be cooled by spraying with water (not shown) and then coated with a sizing by an applicator, such as a graphite roll applicator. After application of the sizing, the glass fibers are gathered by an alignment device which aligns each of the fibers to form one or more strands 68 in which each of the fibers is generally adjacent and coplanar (in side-by-side or generally parallel alignment). Non-limiting examples of suitable alignment devices include rotatable or stationary gathering shoes or a comb, as discussed in *Loewenstein* at page 173, which is hereby incorporated by reference. Preferably, the number of strands 68 ranges from 1 to about 10 strands and, more preferably, 1 to about 6 strands.

Alternatively, the fiber forming apparatus can be, for example, a forming device for non-glass fibers or strands, the methods and apparatus for which are discussed in detail above.

In the alternative embodiment shown in FIG. 4, the strands 466 of the secondary layer 414 are formed from discontinuous, chopped glass fiber strands 469. Referring to FIG. 8, there is shown in phantom a chopper 82 positioned proximate the conveyor 50 from which a supply of chopped glass fiber strands 469 is dispensed onto the surface 16 of the primary layer 12. Alternatively, the strands can be chopped at a location spaced apart from and remote to the mat forming apparatus and transported to the mat forming apparatus.

Preferably the chopper 82 dispenses about 2.8 to about 280 grams of strand per minute per linear millimeter width (about 30 to about 300 ounces per minute per linear foot width). The amount of chopped strand 469 per unit area deposited upon the primary layer 12 is also a function of the conveyor speed.

Non-limiting examples of suitable choppers 82 include the Model 90 cutter and Model 120 inch extra wide cutters which are commercially available from Finn and Fram, Inc. of California. Useful apparatus and processes for forming a layer of chopped strands is disclosed in *Loewenstein* at pages 293–303, which are hereby incorporated by reference.

Figure 6:
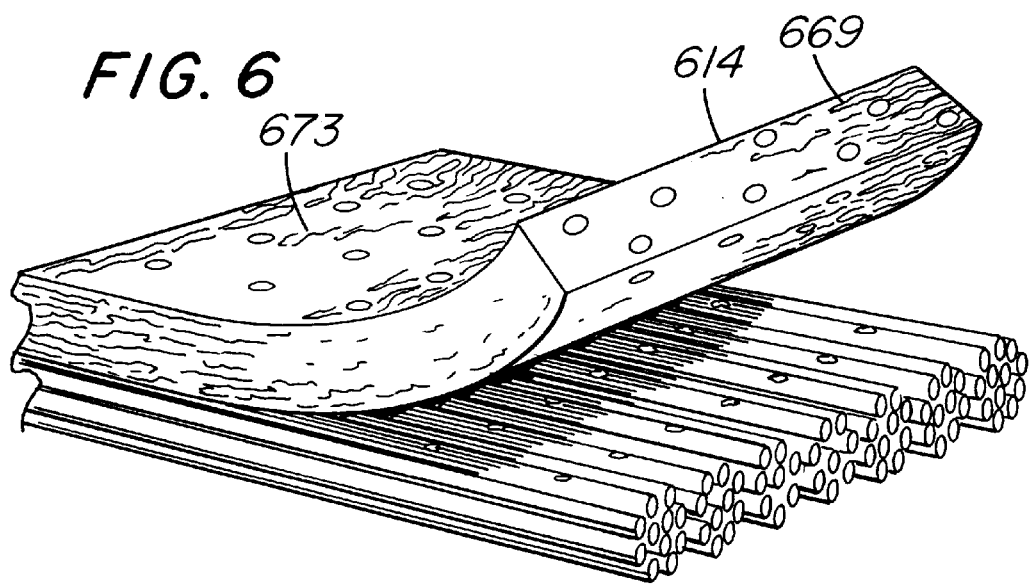
FIG. 6 is an enlarged schematic perspective view of a portion of another alternative embodiment of a mat, according to the present invention.

In the alternative embodiment shown in FIG. 6, at least a portion of the chopped glass fiber strand 669 can be opened up or filamentized, prior to forming the secondary layer 614 therefrom, by a carding machine such as are commercially available from Hollingsworth on Wheels, Inc. of Greenville, S.C. or N. Schlumberger (USA) Inc. of Charlotte, N.C. Preferably the chopped strand is filamentized by passing the chopped strand through a filamentizing webber system, such as the MODEL B RANDO-WEB® processor system which is commercially available from Rando, Inc. of Macedon, N.Y. See "From Bale to Nonwoven Web in one Continuous Operation", a publication of Rando, Inc. (September 1990) at pages 4–5, which are hereby incorporated by reference.

The percentage of filamentized chopped strand 673 can be adjusted by adjusting the tolerances between the mating rolls of the strand opener, the rotational speed of the rolls and conveyors and by the selection of components for the coating composition and loss on ignition of the coating composition on the glass. The filamentization can also be controlled by using different coating compositions having different adhesive properties on separate portions of the glass supply. Generally the percentage of filamentized chopped strand 673 can range from about 1 to about 95 weight percent of the secondary layer 614 on a total solids basis, and preferably about 10 to about 90 weight percent.

Alternative embodiments comprising a secondary layer having a mixture of continuous glass strand 768 and chopped glass strands 769 (shown in FIG. 7) or alternating sublayers of continuous glass strand 568 and chopped glass strands 569 (shown in FIG. 5) can be produced by positioning one or more choppers 82 proximate the conveyor 50 at a predetermined distance from the strand feeders 74 in the direction 54 such that chopped strands ejected from the chopper 82 are deposited upon the upper surface 16 of the primary layer 12 of generally continuous strands 18.

The dimensions and physical characteristics of the secondary layer 14 will now be discussed. Referring to FIG. 2, the width 80 of the secondary layer 14 (which can be greater than or correspond generally to the overall width 42 of the mat 10) can range from about 0.6 to about 3 meters (about 24 to about 120 inches), and preferably ranges from about 1.2 to about 2.8 meters (about 48 to about 110 inches). The length of the secondary layer 14 corresponds generally to the length of the primary layer 12.

The thickness 84 of the secondary layer 14 can range from about 5 to about 305 millimeters (about 0.25 to about 12 inches) prior to needling. The surface weight of the secondary layer 14 of the mat 10 can range from about 715 to about 1150 grams per square meter prior to needling (about 2.3 to about 4 ounces per square foot).

Referring now to FIG. 3, there is shown a mat 310 comprising alternating primary layers 312 and secondary layers 314. Such a mat 310 can be formed by forming a mat 10 having a primary layer 12 and secondary layer 14 such as discussed above and stacking a plurality of mats 10 prior to needling, for example.

The number of primary layers 312 and secondary layers 314 can vary as desired, and can be a function of cost and the desired overall mat thickness. The number of layers 312, 314 can range from 1 to about 5. Three primary layers 312 and three secondary layers 314 are shown in FIG. 3. Alternatively, the mat 310 can comprise a different number of primary layers 312 than secondary layers 314.

As shown in FIG. 3, in an alternative embodiment the mat 310 can include a fabric 333 of glass fibers and/or non-glass fibers (as defined above), such as an engineered knit or woven fabrics or woven roving, within or between the primary layers 312 and secondary layers 314.

Referring now to FIG. 8, the strands 18 of the primary layer 12 are entangled with the strands 66 of the secondary layer 14 by needling the strands 18 of the primary layer 12 are entangled with the strands 66 of the secondary layer 14 together. The needling can be accomplished by passing the mat 10 through a needler 86 between generally known spaced needling boards 88, such as are disclosed in assignee's U.S. Pat. No. 4,277,531, which is hereby incorporated by reference.

A plurality of spaced needles 90 are used to entangle or intertwine the strands 18, 66 of the mat 10 to impart mechanical strength and integrity to the mat 10. The needles 90 are constructed and arranged with a barb which entangles the strands 18, 66 contained in the mat 10 as the needles 90 pass through the mat 10 forming aperture 92 (shown for example if FIGS. 1 and 2) on the downward stroke of the vertical reciprocation of the needles 90 and preferably release the fibers 18, 66 contained within the mat 10 during the upward stroke of the reciprocating needler. Alternatively, needles with reverse barbs can be used to form the mat of the present invention. As used herein, the term "horizontal(ly)" means that the direction of movement is generally parallel with respect to ground 94. As used herein, the term "vertical (ly)", "downwardly" and "upwardly" refer to direction of movement which is generally perpendicular with respect to ground 94.

During vertical upward movement 96, the needles 90 are passed through a plurality of generally cylindrical orifices in a metal stripper plate (not shown for clarity in the drawings) which rests upon the mat 10 during its passage throughout the needler 86. The strands 18 are thus pulled from the surface of the barb as the mat 10 proceeds in horizontal direction 54 after a stroke of the needle 90 in a downward and upward direction. The mat 10 passes over a metal bed plate 98 having a plurality of generally cylindrical orifices therethrough aligned with the orifices of the stripper plate through which the needles 90 pass on the downward stroke of the needleboard 88.

The needleboard 88 can be reciprocated such that a full stroke (downward and upward motion) occurs in a period of about 100 to about 1000 strokes per minute and upon completion of each reciprocation rollers 100 are provided in association with the needler 86 to move the mat 10 in the generally horizontal direction 54 in preparation for the successive downward stroke of the needleboard 88.

A non-limiting example of a suitable needling machine is Model NL 9 which is commercially available from Textilmaschinenfabrik Dr. Ernest Fehrer AG of Germany.

The length of the needle 90, the depth of the penetration of the needle 90 through the mat 10 during its passage through the needler 86 and the extent to which the fibers 18, 66 entangled in the barb of the needle 90 are moved in a generally vertical upward direction 96 through the mat 10 during the upward stroke of the needler 86 determine the extent to which impact strength can be imparted to the composite 913 (shown in FIG. 9) incorporating the mat 10 as reinforcement.

Preferably, the gauge of the needle 90 ranges from about 32 to about 19 gauge, with a combination of 25 and 32 gauge needles being preferred. The punch density is preferably about 10 to about 100 punches per square centimeter.

The punching depth or degree of penetration of the needles into the orifices of the bed plate 98 preferably ranges from about 7.5 to about 20 millimeters (about 0.3 to about 0.8 inches). In a typical needling process, the mat 10 entering the needler 86 can have an overall average thickness of about 9 to about 307 millimeters. After passage throughout the needler 86, the mat 10 can have a compressed overall average thickness 102 of about 5 to about 20 millimeters (about 0.2 to about 0.8 inches). The needling process is described in further detail in assignee's U.S. Pat. No. 4,335,176, which is hereby incorporated by reference.

The surface weight of the mat 10 after needling can range from about 1300 to about 11,500 grams per square meter (about 4.25 to about 37.6 ounces per square foot), and preferably about 1300 to about 8000 grams per square meter.

The overall width 42 of the mat 10 can range from about 0.6 to about 3 meters (about 24 to about 120 inches), and preferably ranges from about 1.2 to about 2.8 meters (about 48 to about 110 inches).

An advantage of such a mat 10 is that it can be readily handled after formation and packaged in a convenient form for transportation to a customer. For example, as shown in FIG. 8, the mat 10 can be rolled to form a roll 104 or festooned or severed into predetermined lengths and packaged in a conventional container 106 of suitable dimensions for shipment to the customer.

Figure 9:
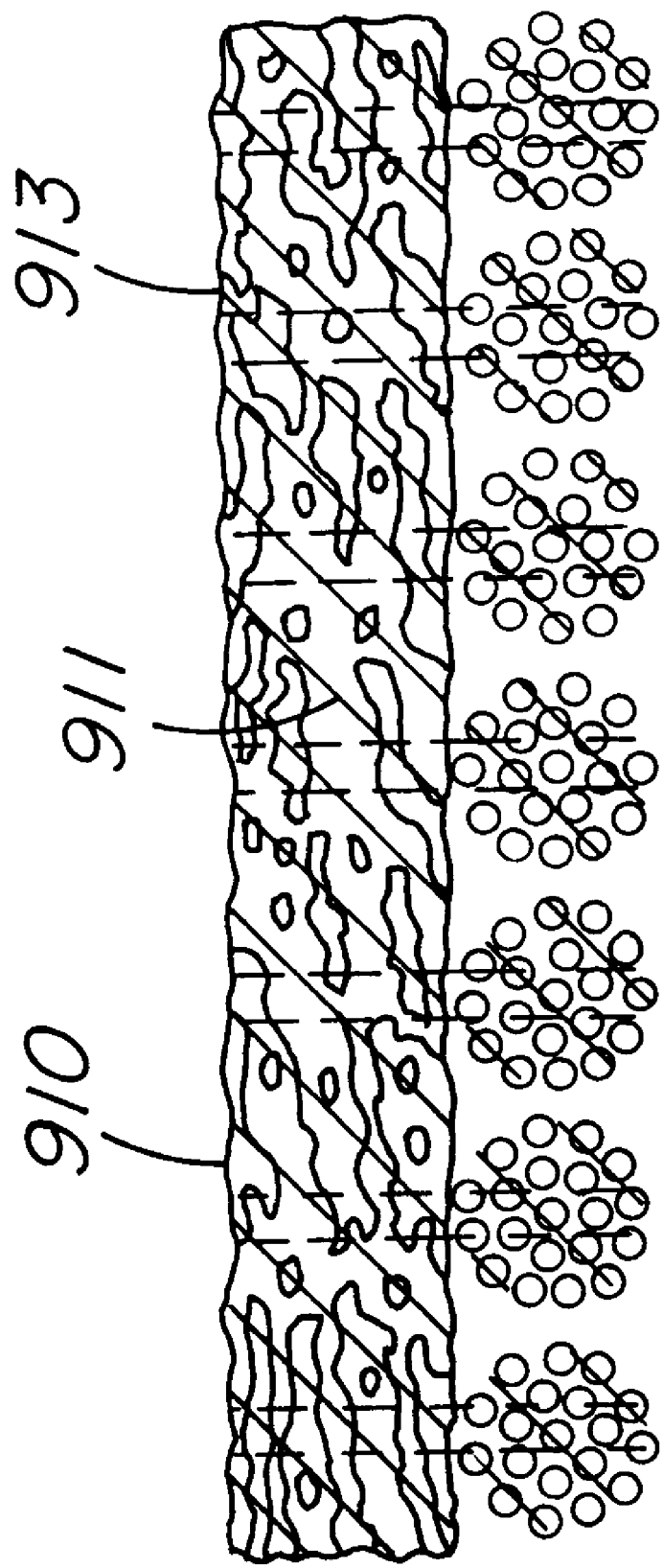
FIG. 9 is an enlarged schematic cross sectional view of a composite, according to the present invention.

Referring now to FIG. 9, the mat 910 can be used to reinforce a thermosetting matrix material 911 to form a polymeric composite 913, by any method known in the art, for example by vacuum molding, open lay-up molding using resin and glass fiber spray-up equipment, preforms for press molding, sheet molding and dough molding, pultrusion, filament winding and panel formation processes.

The preferred method for forming a composite 913 of the present invention is by vacuum molding. A preferred vacuum molding process is disclosed in U.S. Pat. Nos. 4,902,215; 5,052,906; 5,316,462; and 5,439,635, which are hereby incorporated by reference. The mats of the present invention provide cost savings and decreased fabrication time in such vacuum molding processes since a single mat can be used for reinforcement rather than multiple mats. Also, the mats of the present invention provide good directionalized strength to composites for applications such as columns, pilings and poles.

Thermosetting matrix materials 911 useful in the present invention can include thermosetting polyesters, vinyl esters, epoxides, phenolics, aminoplasts, thermosetting polyurethanes, derivatives and mixtures thereof. Preferably the thermosetting matrix material is a polyester or vinyl ester.

Suitable thermosetting polyesters include the AROPOL products which are commercially available from Ashland Chemical Inc. of Columbus, Ohio. Examples of useful vinyl esters include DERAKANE® products such as DERAKANE® 470-45, which are commercially available from Dow Chemical USA of Midland, Mich.

Useful epoxides are discussed in detail above. Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical.

A non-limiting example of a useful phenolic is phenol-formaldehyde. and RESIMENE 841 melamine formaldehyde from Monsanto. An example of a suitable thermosetting polyurethane is STR-400, which is commercially available from Bayer.

Other components which can be included with the thermosetting matrix material 911 and reinforcing mat 910 in the composite 913 are, for example, colorants or pigments, lubricants or process aids, ultraviolet light (UV) stabilizers, antioxidants, other fillers, and extenders.

The mat 910 and thermosetting matrix material(s) 911 can be formed into a composite 913 by a variety of methods which are dependent upon such factors as the type of thermosetting matrix material 911 used. Thermosetting matrix materials can be cured by application of heat. The temperature and curing time for the thermosetting matrix material depends upon such factors as the type of thermosetting matrix material used, other additives in the matrix system and thickness of the composite, to name a few.

A method according to the present invention for making a mat adapted to reinforce a thermosetting matrix material will now be described generally.

With reference to FIG. 8, the method generally comprises the initial step of positioning a plurality of generally parallel, essentially continuous glass fiber strands 18 generally perpendicularly to a longitudinal axis 22 of the mat 10 to form a primary layer 12. The strands 18 have on at least a portion thereof a first coating composition which is compatible with the thermosetting matrix material, discussed in detail above.

In a preferred embodiment, a plurality of essentially continuous glass fiber strands 66 is dispersed upon the primary layer 12 to form a secondary layer 14, such that the glass fiber strands 66 of the secondary layer 14 are randomly oriented as discussed above. The strands 66 are preferably dispersed by one or more strand feeders 74 in a manner such as is discussed in detail above. The strands 66 have on at least a portion thereof a second coating composition which is compatible with the thermosetting matrix material, discussed in detail above.

Alternatively or additionally, a plurality of chopped glass fiber strands 469 is dispersed upon the upper surface of the primary layer 412, the strands 469 having a average length such as is discussed above. The strands 469 can be dispersed onto the primary layer 412 from a chopper 82 in a manner such as is discussed in detail above.

The unidirectional glass fiber strands 18 of the primary layer 12 are entangled with the glass fiber strands 66 of the secondary layer 14 by needling the layers 12, 14 together to form the mat 10. Suitable needlers and the methods for needling are discussed in detail above.

A method according to the present invention for reinforcing a thermosetting matrix material to form a reinforced composite will now be described generally. The method comprises the initial step of positioning a plurality of generally parallel, essentially continuous glass fiber strands 18 generally perpendicular to a longitudinal axis 22 of the mat 10 to form a primary layer 12, as discussed above.

In a preferred embodiment, a plurality of essentially continuous and/or chopped glass fiber strands 66 is dispersed upon the primary layer 12 to form a secondary layer 14, such that the glass fiber strands 66 of the secondary layer 14 are randomly oriented as discussed above. Methods and apparatus for forming and needling the mat 10 are discussed in detail above.

At least a portion of the mat 10 is coated and impregnated with the thermosetting matrix material 911. The thermosetting matrix material 911 is at least partially cured to form the reinforced composite 913, preferably by the application of heat or a curing agent such as discussed above.

The present invention will now be illustrated by the following specific, non-limiting examples.

EXAMPLE 1

The aqueous sizing composition of Table 1 was prepared, applied to 28 micrometer average diameter E-glass fibers and the fibers were gathered into bundles of about 3920 fibers per bundle and wound onto individual forming packages in a manner similar to that discussed above in the specification. The weight of sizing composition on the fibers after drying the forming package at a temperature of about 140° C. (285° F.) for about 11 hours was about 0.55 weight percent, i.e., loss on ignition. These fibers were used to form a primary layer of mat according to the present invention, as discussed below.

TABLE 1

| COMPONENT | Weight of Component per unit of aqueous sizing composition grams per gallon |
|---|---|
| epoxy resin[1] | 289 |
| polyester resin[2] | 50.2 |
| partially amidated polyethylene imine[3] | 2.66 |
| polyvinyl pyrrolidone[4] | 59.56 |
| polyoxyethylated vegetable oil[5] | 33.64 |
| ethoxylated octylphenoxyethanol[6] | 16.57 |
| polyoxypropylene-polyoxyethylene copolymer[7] | 33.64 |
| gamma-aminopropyltriethoxysilane[8] | 46.88 |
| gamma-glycidoxypropyltrimethoxysilane[9] | 27.6 |
| anti-foaming material[10] | 0.88 |
| acetic acid | 5.52 |
| water | 2142.72 |

[1]EPON ® 880 epoxy resin which is commercially available from Shell Chemical Co. Of Houston Texas.
[2]RD-847-A polyester resin which is commercially available from Borden Chemicals of Columbus, Ohio.
[3]EMERY ® 6717 partially amidated polyethylene imine which is available from Henkel Corporation of Kankakee, Illinois.
[4]PVP K-30 polyvinyl pyrrolidone which is commercially available from ISP Chemicals of Wayne, New Jersey.
[5]EMULPHOR EL-719 polyoxyethylated vegetable oil which is commercially available from GAF Corporation of Wayne, New Jersey.
[6]IGEPAL CA-630 ethoxylated octylphenoxyethanol which is commercially available from GAF Corporation of Wayne, New Jersey.
[7]PLURONIC ™ F-108 polyoxypropylene-polyoxyethylene copolymer which is commercially available from BASF Corporation of Parsippany, New Jersey.
[8]A-174 gamma-methacryloxypropyltrimethoxysilane which is commercially available from OSi Specialties, Inc. of Danbury, Connecticut.
[9]Z-6040 gamma-glycidoxypropyltrimethoxysilane coupling agent which is commercially available from Dow Corning.
[10]SAG 10 anti-foaming material.

The aqueous sizing composition of Table 2 was prepared, applied to K filament E-glass fibers and the fibers were gathered into bundles of about 800 fibers per bundle and wound onto individual forming packages in a manner similar to that discussed above in the specification. The weight of sizing composition on the fibers after drying the forming package at a temperature of about 118° C. (about 245° F.) for about 13 hours was about 0.55 weight percent, i.e., loss on ignition. These fibers were used to form a secondary layer of mat according to the present invention, as discussed below.

TABLE 2

| COMPONENT | Weight of Component per unit of aqueous sizing composition grams per gallon |
|---|---|
| epoxy resin[11] | 94.6 |
| polyester resin[12] | 22.7 |
| partially amidated polyethylene imine[13] | 2.84 |
| polyvinyl pyrrolidone[14] | 21.8 |
| polyoxyethylated vegetable oil[15] | 10.88 |
| ethoxylated octylphenoxyethanol[16] | 6.16 |
| polyoxypropylene-polyoxyethylene copolymer[17] | 10.88 |
| gamma-aminopropyltriethoxysilane[18] | 21.8 |
| acetic acid | 0.84 |
| water | 2180 |

[11]EPON ® 828 epoxy resin which is commercially available from Shell Chemical Co. Of Houston Texas.
[12]RD-847-A polyester resin which is commercially available from Borden Chemicals of Columbus, Ohio.
[13]EMERY ® 6717 partially amidated polyethylene imine which is available from Henkel Corporation of Kankakee, Illinois.
[14]PVP K-30 polyvinyl pyrrolidone which is commercially available from ISP Chemicals of Wayne, New Jersey.
[15]EMULPHOR EL-719 polyoxyethylated vegetable oil which is commercially available from GAF Corporation of Wayne, New Jersey.
[16]IGEPAL CA-630 ethoxylated octylphenoxyethanol which is commercially available from GAF Corporation of Wayne, New Jersey.
[17]PLURONIC ™ F-108 polyoxypropylene-polyoxyethylene copolymer which is commercially available from BASF Corporation of Parsippany, New Jersey.
[18]A-174 gamma-methacryloxypropyltrimethoxysilane which is commercially available from OSi Specialties, Inc. of Danbury, Connecticut.

The primary layer of the mat was formed on a standard conveyor using the strands coated with the sizing composition of Table 1 above. The conveyor speed was 5.09 meters per minute (about 16.7 feet per minute). The overall mat width was 254+/−0.6 centimeters (100+/−0.25 inches). The strands of the primary layer were unidirectionally aligned at a spacing of about 2.9 strands per centimeter (7.30 strands per inch) width of mat.

The secondary layer of the mat was formed by depositing the strands of K fibers coated with the sizing composition of Table 2 onto the primary layer. The secondary strands were deposited onto the primary layer by 13 strand feeders, each strand feeder dispensing 6 strands.

The mat was needled at a needler speed of about 5.1 meters per minute (about 16.8 feet per minute). Twenty-seven rows of 25 gauge needles at a needle penetration of about 14.5 millimeters +/−1.5 millimeters were used to needle the mat. The punch density was about 63 punches per centimeter (about 160 punches per square inch). The needler speed was about 750 strokes per minute.

The average total surface weight of the mat was about 2394.5 grams per square meter (about 7.83 ounces per square foot), of which about 75 weight percent was composed of the unidirectional strands of the primary layer and about 25 weight percent was composed of the random strands of the secondary layer. The average total surface weight was determined from a random array of eight samples taken across the width of the mat by eleven samples taken along the length of the mat.

EXAMPLE 2

A mat was formed using glass fiber strands coated with the sizing composition of Table 1 as a primary layer and glass fiber strands coated with the sizing composition of Table 2 as a secondary layer according to the present invention, in the manner discussed in Example 1 above.

The primary layer of the mat was formed on a standard conveyor using the strands of 3920 fibers (each fiber having an average diameter of 24.0 micrometers) coated with the sizing composition of Table 1 above. The conveyor speed was 1.07 meters per minute (about 3.5 feet per minute). The overall mat width was 122 centimeters (48 inches). The strands of the primary layer were unidirectionally aligned at a spacing of about 5.5 strands per centimeter (13.97 strands per inch) width of mat.

The secondary layer of the mat was formed by depositing the strands of K fibers coated with the sizing composition of Table 2 onto the primary layer. The secondary strands were deposited onto the primary layer by 2 strand feeders, each strand feeder dispensing 11 strands.

Thirteen rows of 25 gauge needles at a needle penetration of about 16.25 millimeters (0.64 inches) were used to needle the mat. The punch density was about 71 punches per centimeter (about 180 punches per square inch). The needler speed was about 193 strokes per minute.

The average total surface weight of the mat was about 4077.5 grams per square meter (about 120 ounces per square yard), of which about 60 weight percent was composed of the unidirectional strands of the primary layer and about 40 weight percent was composed of the random strands of the secondary layer.

EXAMPLE 3

A mat was formed using glass fiber strands coated with the sizing composition of Table 1 as a primary layer and glass fiber strands coated with the sizing composition of Table 2 as a secondary layer according to the present invention, in the manner discussed in Example 1 above.

The primary layer of the mat was formed on a standard conveyor using the strands of T fibers coated with the sizing composition of Table 1 above. The conveyor speed was 1.1 meters per minute (about 3.66 feet per minute). The overall mat width was 122 centimeters (48 inches). The strands of the primary layer were unidirectionally aligned at a spacing of about 5.5 strands per centimeter (13.96 strands per inch) width of mat.

The secondary layer of the mat was formed by depositing the strands of K fibers coated with the sizing composition of Table 2 onto the primary layer. The secondary strands were deposited onto the primary layer by 2 strand feeders, each strand feeder dispensing 16 strands.

Thirteen rows of 25 gauge needles at a needle penetration of about 16.25 millimeters (0.64 inches) were used to needle the mat. The punch density was about 95 punches per centimeter (about 242 punches per square inch). The needler speed was about 272 strokes per minute.

The total surface weight of the mat was about 4757 grams per square meter (about 140 ounces per square yard), of which about 51.3 weight percent was composed of the unidirectional strands of the primary layer and about 48.7 weight percent was composed of the random strands of the secondary layer.

EXAMPLE 4

A mat was formed using glass fiber strands coated with the sizing composition of Table 1 as a primary layer and glass fiber strands coated with the sizing composition of Table 2 as a secondary layer according to the present invention, in the manner discussed in Example 1 above.

The primary layer of the mat was formed on a standard conveyor using the strands of T fibers coated with the sizing composition of Table 1 above. The conveyor speed was 1.81 meters per minute (about 5.94 feet per minute). The overall mat width was 127 centimeters (50 inches). The strands of the primary layer were unidirectionally aligned at a spacing of about 4 strands per centimeter (10.21 strands per inch) width of mat.

The secondary layer of the mat was formed by depositing the strands of K fibers coated with the sizing composition of Table 2 onto the primary layer. The secondary strands were deposited onto the primary layer by 2 strand feeders, each strand feeder dispensing 8 strands.

Thirteen rows of 25 gauge needles at a needle penetration of about 15.5 millimeters (0.61 inches) were used to needle the mat. The punch density was about 63 punches per centimeter (about 160 punches per square inch). The needler speed was about 292 strokes per minute.

The total surface weight of the mat was about 2379 grams per square meter (about 70 ounces per square yard), of which about 75 weight percent was composed of the unidirectional strands of the primary layer and about 25 weight percent was composed of the random strands of the secondary layer.

EXAMPLE 5

Mats were formed using glass fiber strands coated with the sizing composition of Table 1 as the primary layer and glass fiber strands coated with the sizing composition of Table 2 as the secondary layer according to the present invention, in the manner discussed in Example 1 above.

The primary layer of the mats was formed on a standard conveyor using the strands of T fibers coated with the sizing composition of Table 1 above. The conveyor speed was 1.81 meters per minute (about 5.94 feet per minute). The overall mat width was 127 centimeters (50 inches). The strands of the primary layer were unidirectionally aligned at a spacing of about 4.7 strands per centimeter (12 strands per inch) width of mat.

The secondary layer of the mats was formed by depositing the strands of K fibers coated with the sizing composition of Table 2 onto the primary layer. The secondary strands were deposited onto the primary layer by 2 strand feeders, each strand feeder dispensing 4 strands.

Thirteen rows of 25 gauge needles at a needle penetration of about 15.5 millimeters (0.61 inches) were used to needle the first mat. The punch density for the first mat was about 63 punches per centimeter (about 160 punches per square inch) and the needler speed was about 292 strokes per minute.

Thirteen rows of 25 gauge needles at a needle penetration of about 12 millimeters (0.47 inches) were used to needle the first mat. The punch density for the second mat was about 39.4 punches per centimeter (about 100 punches per square inch) and the needler speed was about 185 strokes per minute.

The total surface weight of each mat was about 2379 grams per square meter (about 70 ounces per square yard). About 88.11 weight percent of each mat was composed of the unidirectional strands of the primary layer and about 11.89 weight percent was composed of the random strands of the secondary layer.

The mats of the present invention have sufficient structural integrity to resist damage during transportation and handling and are useful in a wide variety of molding processes. The mats of the present invention exhibit good formability and structural integrity which facilitates handling of the mat and enables the fabricator to decrease mold cycle times. The ability to mold with a single ply can reduce cost and decrease fabrication time.

Other advantages of the mats of the present invention include good flexibility and high density to provide good load bearing capabilities, high shear strength, compressive strength and interlaminar shear strength, good cross directional uniformity, low washing or squeeze out during mat compaction during molding, low delamination and springback of the mat during composite formation, good flexibility, processing and sheet loft performance, high reinforcement weight capability, good flow and knitline properties, good surface and blister characteristics.

It will be appreciated by those skilled in the art that changes could be made to the embodiments described above without departing from the broad inventive concept thereof.

It is understood, therefore, that this invention is not limited to the particular embodiments disclosed, but it is intended to cover modifications which are within the spirit and scope of the invention, as defined by the appended claims.

Therefore, we claim:

1. A mat adapted to reinforce a thermosetting matrix material, the mat comprising:
   (a) a primary layer comprising a plurality of generally parallel, essentially continuous glass fiber strands oriented generally parallel to a longitudinal axis of the mat, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials, the primary layer of the mat having a surface weight ranging from about 585 to about 10,350 grams per square meter and comprising about 45 to about 90 weight percent of the mat on a total solids basis; and
   (b) a secondary layer positioned adjacent to a surface of the primary layer, the secondary layer comprising a plurality of randomly oriented, generally continuous glass fiber strands, at least a portion of outer surfaces of the plurality of the glass fiber strands of the secondary layer having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, wherein the strands of the primary layer are entangled with the strands of the secondary layer by needling together at least a portion of the strands of the primary layer and the strands of the secondary layer to form a mat, the secondary layer of the mat having a surface weight ranging from about 715 to about 1,150 grams per square meter.

2. The mat according to claim 1, wherein the glass fiber strands of the primary layer have on at least a portion of the outer surfaces thereof an essentially dried residue of the first coating composition.

3. The mat according to claim 1, wherein an average distance between a pair of adjacent strands of the primary layer ranges from about 0.1 to about 20 millimeters.

4. The mat according to claim 1, wherein the primary layer comprises about 60 to about 80 weight percent of the mat on a total solids basis.

5. The mat according to claim 1, wherein the first coating composition which is present upon the portion of the outer surfaces of the glass fiber strands of the primary layer further comprises a glass fiber lubricant.

6. The mat according to claim 1, wherein the glass fiber strands of the secondary layer have on at least a portion of the outer surfaces thereof an essentially dried residue of the second coating composition.

7. The mat according to claim 1, wherein the second coating composition is different from the first coating composition.

8. The mat according to claim 1, wherein the second coating composition is the same as the first coating composition.

9. The mat according to claim 1, wherein the plurality of randomly oriented, generally continuous glass fiber strands of the secondary layer comprises about 50 to about 100 weight percent of the secondary layer on a total solids basis.

10. The mat according to claim 1, wherein the primary layer and secondary layer are needled together at a punch density ranging from about 10 to about 100 punches per square centimeter.

11. The mat according to claim 1, wherein the surface weight of the mat ranges from about 2000 to about 4000 grams per square meter.

12. The mat according to claim 1, wherein the mat further comprises a plurality of primary layers.

13. The mat according to claim 1, wherein the mat further comprises a plurality of secondary layers.

14. The mat according to claim 1, wherein the secondary layer further comprises a plurality of randomly oriented glass fibers having a mean average length ranging from about 10 to about 150 millimeters.

15. The mat according to claim 14, wherein at least a portion of the glass fibers of the secondary layer are present as discrete monofilaments.

16. The mat according to claim 1, wherein the primary and/or secondary layers of the mat further comprises a plurality of non-glass fibers.

17. The mat according to claim 1, further comprising a fabric layer comprising a plurality of glass fibers.

18. The mat according to claim 1, further comprising a knitted or woven fabric layer comprising a plurality of glass fibers.

19. A mat adapted to reinforce a thermosetting matrix material, the mat comprising:
   (a) a primary layer comprising a plurality of generally parallel, essentially continuous glass fiber strands oriented generally parallel to a longitudinal axis of the mat, at least a portion of outer surfaces of the plurality of the glass fibers having thereon a first layer comprising a first coating composition which is compatible with a thermosetting matrix material, the first coating composition comprising a thermosetting film-forming material, the primary layer of the mat having a surface weight ranging from about 585 to about 10,350 grams per square meter and comprising about 45 to about 90 weight percent of the mat on a total solids basis; and
   (b) a secondary layer positioned adjacent to a surface of the primary layer, the secondary layer comprising a plurality of randomly oriented, generally continuous glass fiber strands, at least a portion of outer surfaces of the plurality of the glass fiber strands of the secondary layer having thereon a layer comprising a second coating composition which is compatible with the thermosetting matrix material, the second coating composition comprising a thermosetting film-forming material, wherein the strands of the primary layer are entangled with the strands of the secondary layer by needling together at least a portion of the strands of the primary layer and the strands of the secondary layer to form a mat, the secondary layer of the mat having a surface weight ranging from about 715 to about 1,150 grams per square meter.

20. A mat adapted to reinforce a thermosetting matrix material, the mat comprising:
   (a) a primary layer comprising a plurality of generally parallel, essentially continuous glass fiber strands oriented generally parallel to a longitudinal axis of the mat, at least a portion of outer surfaces of the plurality of the glass fiber strands having thereon a layer comprising a first coating composition comprising a polymeric film-forming material which is selected from the group consisting of thermosetting materials, vinyl acetate materials and thermoplastic polyester materials, the primary layer of the mat having a surface weight ranging from about 585 to about 10,350 grams per square meter and comprising about 45 to about 90 weight percent of the mat on a total solids basis; and (b) a secondary layer positioned adjacent to a surface of the primary layer, the secondary layer comprising a plurality of randomly oriented glass fibers having a average length ranging from about 10 to about 150 millimeters, at least a portion of an outer surfaces of the plurality of the glass fibers of the secondary layer having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, wherein the strands of the primary layer are entangled with the strands of the secondary layer by needling together at least a portion of the strands of the primary layer and the fibers of the secondary layer to form a mat, the secondary layer of the mat having a surface weight ranging from about 715 to about 1,150 grams per square meter.

21. The mat according to claim 20, wherein at least at least a portion of the glass fibers of the secondary layer are present as discrete monofilaments.

22. A reinforced polymeric composite comprising:
(a) a thermosetting matrix material; and
(b) a reinforcing mat comprising:
  (1) a primary layer comprising a plurality of generally parallel, essentially continuous glass fiber strands oriented generally parallel to a longitudinal axis of the mat, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials, the primary layer of the mat having a surface weight ranging from about 585 to about 10,350 grams per square meter and comprising about 45 to about 90 weight percent of the mat on a total solids basis; and
  (2) a secondary layer positioned adjacent to a surface of the primary layer, the secondary layer comprising a plurality of randomly oriented, generally continuous glass fiber strands, at least a portion of outer surfaces of the plurality of the glass fiber strands of the secondary layer having thereon a layer comprising a second coating composition which is compatible with the thermosetting matrix material comprising a polymeric film-forming material which is selected from the group consisting of thermosetting materials, vinyl acetate materials and thermoplastic polyester materials, wherein the strands of the primary layer are entangled with the strands of the secondary layer by needling together at least a portion of the strands of the primary layer and the strands of the secondary layer to form a mat, the secondary layer of the mat having a surface weight ranging from about 715 to about 1,150 grams per square meter.

23. The composite according to claim 22, wherein the thermosetting matrix material is selected from the group consisting of thermosetting polyesters, vinyl esters, epoxides, phenolics, aminoplasts, thermosetting polyurethanes, copolymers thereof, and mixtures thereof.

24. A method for making a mat adapted to reinforce a thermosetting matrix material, the method comprising the steps of:

(a) positioning a plurality of generally parallel, essentially continuous glass fiber strands generally parallel to a longitudinal axis of the mat to form a primary layer, such that the primary layer of the mat has a surface weight ranging from about 585 to about 10,350 grams per square meter, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials;

(b) dispersing a plurality of essentially continuous glass fiber strands upon a surface of the primary layer to form a secondary layer, such that the secondary layer of the mat has a surface weight ranging from about 715 to about 1,150 grams per square meter, at least a portion of outer surfaces of the plurality of the glass fiber strands having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, such that the glass fiber strands of the secondary layer are randomly oriented; and (c) entangling the generally parallel, essentially continuous glass fiber strands of the primary layer with the essentially continuous, randomly oriented glass fiber strands of the secondary layer by needling at least a portion of the strands of the primary layer and the strands of the secondary layer together to form a mat, wherein the primary layer comprises about 45 to about 90 weight percent of the mat on a total solids basis.

25. A method for reinforcing a thermosetting matrix material to form a reinforced composite, the method comprising the steps of:

(a) positioning a plurality of generally parallel, essentially continuous glass fiber strands generally parallel to a longitudinal axis of the mat to form a primary layer, such that the primary layer of the mat has a surface weight ranging from about 585 to about 10,350 grams per square meter, at least a portion of outer surfaces of the plurality of the glass fiber strands having thereon a layer comprising a first coating composition which is compatible with a thermosetting matrix material, the first coating composition comprising a polymeric film-forming material which is selected from the group consisting of thermosetting materials, vinyl acetate materials and thermoplastic polyester materials;

(b) dispersing a plurality of essentially continuous glass fiber strands upon a surface of the primary layer to form a secondary layer, such that the secondary layer of the mat has a surface weight ranging from about 715 to about 1,150 grams per square meter, at least a portion of outer surfaces of the plurality of the glass fiber strands having thereon a layer comprising a second coating composition which is compatible with the thermosetting matrix material, the second coating composition comprising a polymeric film-forming material which is selected from the group consisting of thermosetting materials, vinyl acetate materials and thermoplastic polyester materials, such that the glass fiber strands of the secondary layer are randomly oriented;

(c) entangling the generally parallel, essentially continuous glass fiber strands of the primary layer with the essentially continuous, randomly oriented glass fiber strands of the secondary layer by needling at least a portion of the strands of the primary layer and the strands of the secondary layer together to form a mat, wherein the primary layer comprises about 45 to about 90 weight percent of the mat on a total solids basis;

(d) coating and impregnating at least a portion of the mat with the thermosetting matrix material; and (e) at least partially curing the thermosetting matrix material to form a reinforced composite.

* * * * *

UNITED STATES PATENT AND TRADEMARK OFFICE
CERTIFICATE OF CORRECTION

PATENT NO. : 5,910,458
DATED : June 8, 1999
INVENTOR(S) : Beer et al.

It is certified that error appears in the above-identified patent and that said Letters Patent is hereby corrected as shown below:

Under "References Cited, U.S. PATENT DOCUMENTS", please include the listing of references by adding the following:

| Document No. | Date | Name | Class | Subclass |
|---|---|---|---|---|
| 3,044,146 | 07/1962 | Thomas et al. | 28 | 78 |
| 4,220,496 | 09/1980 | Carley et al. | 155 | 174 |

Also, on page 2, second column of U.S. PATENT DOCUMENTS, please correct "5,129,113" and replace it with -- 5,129,131 --.

Under FOREIGN PATENT DOCUMENTS, in the second column, please correct "WO 92/00491" and replace it with -- WO 92/04491 --.

Please amend claim 14 in the following manner:
Column 26,
Line 3, delete the word "mean".

Signed and Sealed this

Twenty-third Day of October, 2001

*Attest:*

*Attesting Officer*

NICHOLAS P. GODICI
*Acting Director of the United States Patent and Trademark Office*